US010065708B2

(12) United States Patent
Labbe et al.

(10) Patent No.: US 10,065,708 B2
(45) Date of Patent: Sep. 4, 2018

(54) SNOWMOBILE SUSPENSION

(71) Applicant: BOMBARDIER RECREATIONAL PRODUCTS INC., Valcourt (CA)

(72) Inventors: Christian Labbe, Sherbrooke (CA); Jean-Francois Lambert, Orford (CA); Yvon Bedard, Orford (CA); Pascal Gagnon, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 316 days.

(21) Appl. No.: 14/894,719

(22) PCT Filed: May 28, 2014

(86) PCT No.: PCT/IB2014/061793
§ 371 (c)(1),
(2) Date: Nov. 30, 2015

(87) PCT Pub. No.: WO2014/191941
PCT Pub. Date: Dec. 4, 2014

(65) Prior Publication Data
US 2016/0121970 A1 May 5, 2016

Related U.S. Application Data

(60) Provisional application No. 61/829,830, filed on May 31, 2013.

(51) Int. Cl.
*B62M 27/02* (2006.01)
(52) U.S. Cl.
CPC ....... *B62M 27/02* (2013.01); *B62M 2027/026* (2013.01)
(58) Field of Classification Search
CPC .................. B62M 27/02; B62M 2027/026
See application file for complete search history.

(56) References Cited

U.S. PATENT DOCUMENTS 3,885,640 A   5/1975 Valentine et al.
4,987,965 A   1/1991 Bourret
(Continued)

FOREIGN PATENT DOCUMENTS

CN   2102229 U   4/1992
CN   1175531 A   3/1998
(Continued)

OTHER PUBLICATIONS

Custom Lightweight Snowmobile & Snow Bike Products., Timbersled Products, Inc., Recieved from the USPTO as International Searching Authority for International Application PCT/IB2014/061793; Oct. 22, 2014.
International Search Report of PCT/IB2014/061793; Shane Thomas; dated Oct. 22, 2014.
English abstract of CN201158415Y; retrieved from http://worldwide.espacenet.com/ on Nov. 26, 2015.
(Continued)

*Primary Examiner* — Joseph M Rocca
*Assistant Examiner* — Daniel S Yeagley
(74) *Attorney, Agent, or Firm* — BCF LLP

(57) ABSTRACT

A snowmobile rear suspension assembly has a first and second suspension arms, a pair of slide rails pivotally connected to lower ends of the suspension arms and at least one shock absorber, a pair of extension arms pivotally connected to a rear portion of the pair of slide rails about a lateral axis and being pivotable between raised 5 and lowered positions about the lateral axis, a pair of rear idler wheels rotationally connected to a rear portion of the pair of extension arms, and at least one spring biasing the pair of extension arms toward the lowered position. At least a portion of at least one of the suspension arms is pivotable about a longitudinally extending axis relative to the pair of slide rails. A snowmobile having the rear suspension, a method 10 of replacing the slide rails of the rear suspension and a slide rails replacement kit are also disclosed.

17 Claims, 13 Drawing Sheets

(56) References Cited

U.S. PATENT DOCUMENTS

| | | | |
|---|---|---|---|
| 6,155,363 A | 12/2000 | Matsumoto et al. | |
| 6,206,124 B1 | 3/2001 | Mallette et al. | |
| 6,631,778 B2 | 10/2003 | Mallette | |
| 6,976,550 B2 | 12/2005 | Vaisanen | |
| 7,422,083 B2 | 9/2008 | Yoshihara et al. | |
| 7,533,749 B1 * | 5/2009 | Sampson | B62M 27/02 180/182 |
| 7,753,154 B2 | 7/2010 | Maltais | |
| 7,789,184 B2 | 9/2010 | Maltais | |
| 7,802,645 B2 | 9/2010 | Mallette et al. | |
| 7,997,372 B2 | 8/2011 | Maltais | |
| 2009/0050390 A1 * | 2/2009 | Mallette | B62M 27/02 180/193 |
| 2009/0085398 A1 * | 4/2009 | Maltais | B62D 55/065 305/178 |
| 2011/0192667 A1 * | 8/2011 | Conn | B62J 25/00 180/190 |
| 2013/0175106 A1 | 7/2013 | Bedard et al. | |

FOREIGN PATENT DOCUMENTS

| | | |
|---|---|---|
| CN | 101239648 A | 8/2008 |
| CN | 201158415 Y | 12/2008 |
| RU | 44629 U1 | 3/2005 |
| WO | 2011075141 A1 | 6/2011 |
| WO | 2013016128 A1 | 1/2013 |

OTHER PUBLICATIONS

English abstract of CN2102229U; retrieved from http://worldwide.espacenet.com/ on Nov. 26, 2015.

English abstract of CN1175531A; retrieved from http://worldwide.espacenet.com/ on Nov. 30, 2015.

English abstract of CN101239648A; retrieved from http://worldwide.espacenet.com/ on Nov. 30, 2015.

Machine Translation of the Summary of RU44629 U1; translated by Google Translate (https://translate.google.ca/m/tanslate?hl=fr) on May 3, 2018.

* cited by examiner

FIG. 6

SNOWMOBILE SUSPENSION

CROSS-REFERENCE

The present application claims priority to U.S. Provisional Patent Application 61/829,830, filed May 31, 2013, the entirety of which is incorporated herein by reference.

TECHNICAL FIELD

The present technology relates to suspension assemblies for tracked vehicles, and more particularly to rear suspension assemblies for snowmobiles.

BACKGROUND

Irregularities in the terrain over which a snowmobile travels produce displacements and deflections of its rear suspension assembly. A conventional rear suspension supports an endless track, which is tensioned to surround a pair of parallel slide rails, a plurality of idler wheels and at least one drive wheel or sprocket. A shock absorbing mechanism involving springs, hydraulic dampers, and/or other shock absorbing elements, urges the slide frame assembly and the chassis (also known as a frame) of the snowmobile, which includes a tunnel, apart against the weight supported above the suspension in a static condition.

When an irregularity such as a bump occurs on the terrain, the rear suspension allows the slide rails to move toward the tunnel. Similarly, when a depression occurs on the terrain, the rear suspension allows the slide rails to move away from the tunnel. In some cases, the terrain provides configurations for which the snowmobiles cannot or can only minimally accommodate. This is the case, for example, when the snowmobile is side-hilling or moving in reverse.

A snowmobile is said to be side-hilling when it is positioned at least partially sideways on a slope. In such a position, an uphill part of the rear suspension is disposed vertically above a downhill part of the rear suspension. This can increase the resistance to lean the snowmobile into the slope to keep the snowmobile horizontal.

When a snowmobile is driven in reverse, particularly on soft snow, the rear portion of the track can dig into the snow and cause the snowmobile to become stuck.

Therefore, there is a need for a rear suspension assembly for a snowmobile that allows the snowmobile to drive on different terrain configurations.

There is also a need for a snowmobile having such a suspension.

There is also a need for a kit for converting an existing rear suspension to such a suspension.

There is also a need for a method for making such a conversion.

SUMMARY

One object of the present technology is to ameliorate at least some of the inconveniences of the prior art.

According to one aspect of the present technology, there is provided a snowmobile having a chassis including a tunnel, the tunnel having a longitudinal direction, an engine connected to the chassis, at least one ski connected to the chassis by a front suspension, an endless drive track disposed below the tunnel and operatively connected to the engine for propulsion of the snowmobile, and a rear suspension assembly supporting and tensioning the endless drive track. The chassis being pivotally connected to the endless drive track via the rear suspension assembly about a longitudinally extending axis. The rear suspension assembly includes a first suspension arm having an upper end and a lower end, the upper end of the first suspension arm being pivotally connected to the tunnel, a second suspension arm having an upper end and a lower end, the upper end of the second suspension arm being pivotally connected to the tunnel, a pair of slide rails pivotally connected to the lower end of the first suspension arm and to the lower end of the second suspension arm, at least one shock absorber connected between the tunnel and the pair of slide rails, the at least one shock absorber biasing the pair of slide rails away from the tunnel, a pair of extension arms pivotally connected to a rear portion of the pair of slide rails about a lateral axis, the pair of extension arms being pivotable between a raised position and a lowered position with respect to the pair of slide rails about the lateral axis, a pair of rear idler wheels rotationally connected to a rear portion of the pair of extension arms for guiding the endless drive track, the pair of rear idler wheels being disposed laterally between the pair of extension arms, and at least one spring biasing the pair of extension arms toward the lowered position by exerting thereon a biasing force.

In some implementations of the present technology, the lateral axis is disposed above the longitudinally extending axis.

In some implementations of the present technology, the rear suspension assembly further includes a pair of track tensioners operatively connecting the pair of rear idler wheels to the pair of extension arms, the pair of track tensioners being disposed laterally between the pair of extension arms.

In some implementations of the present technology, the lateral axis is disposed above a line passing through a center of the pair of rear idler wheels and bisecting an angle between top and bottom track portions of the drive track extending forward from the pair of rear idler wheels when the pair of extension arms is in the lowered position.

In some implementations of the present technology, the rear suspension assembly further includes a movable member movable between a first position and a second position to adjust a magnitude of the biasing force.

In some implementations of the present technology, the rear suspension assembly further includes at least one blocking cam mounted to one of the pair of slide rails and the pair of extension arms, the at least one blocking cam being movable between a first position and a second position to selectively prevent the pair of extension arms from pivoting from the lowered position to the raised position, and at least one stopper mounted to the other of the pair of slide rails and the pair of extension arms. When the pair of extension arms is in the lowered position, the at least one blocking cam is movable between: the first position, where the at least one blocking cam prevents the pair of extension arms from pivoting to the raised position; and the second position, where the at least one blocking cam permits the pair of extension arms to pivot to the raised position. When the at least one blocking cam is in the second position and the pair of extension arms is in the raised position, the at least one blocking cam abuts against the at least one stopper.

In some implementations of the present technology, the rear suspension assembly further includes a ball joint pivotally connecting the lower end of the second suspension arm to the pair of slide rails about the longitudinally extending axis.

In some implementations of the present technology, the lateral axis is a first lateral axis. The rear suspension assembly further includes a rocker arm having an upper end and a lower end. The upper end of the rocker arm is pivotally connected to the lower end of the second suspension arm about a second lateral axis. The lower end of the rocker arm is pivotally connected to the pair of slide rails about a third lateral axis. The first lateral axis is vertically higher than the second lateral axis.

In some implementations of the present technology, the lateral axis is a first lateral axis. The rear suspension assembly further includes a rocker arm having an upper end and a lower end. The upper end of the rocker arm is pivotally connected to the lower end of the second suspension arm about a second lateral axis. The lower end of the rocker arm is pivotally connected to the pair of slide rails about a third lateral axis. The upper end of the first suspension arm is pivotally connected to the tunnel about a fourth lateral axis. The pair of rear idler wheels is rotationally connected to the rear portion of the pair of extension arms about a wheel axis. When the pair of extension arms is in the lowered position, the wheel axis is disposed below the longitudinally extending axis and above a longitudinally extending line passing through the second and fourth lateral axes. When the pair of extension arms is in the raised position, the wheel axis is disposed above the longitudinally extending axis and the longitudinally extending line.

In some implementations of the present technology, the rear suspension assembly further includes at least one pair of caps connected to at least one of a front end a rear end of the pair of slide rails.

In some implementations of the present technology, a rear suspension assembly for a snowmobile having a tunnel has a first suspension arm having an upper end and a lower end, the upper end of the first suspension arm being adapted to be pivotally connected to the tunnel, a second suspension arm having an upper end and a lower end, the upper end of the second suspension arm being adapted to be pivotally connected to the tunnel, a pair of slide rails pivotally connected to the lower end of the first suspension arm and to the lower end of the second suspension arm, at least one shock absorber adapted to be connected to the tunnel and connected to the pair of slide rails, the at least one shock absorber being adapted for biasing the pair of slide rails away from the tunnel, a pair of extension arms pivotally connected to a rear portion of the pair of slide rails about a lateral axis, the pair of extension arms being pivotable between a raised position and a lowered position with respect to the pair of slide rails about the lateral axis, a pair of rear idler wheels rotationally connected to a rear portion of the pair of extension arms, the pair of rear idler wheels being disposed laterally between the pair of extension arms, and at least one spring biasing the pair of extension arms toward the lowered position by exerting thereon a biasing force. At least a portion of at least one of the first and second suspension arms is pivotable about a longitudinally extending axis relative to the pair of slide rails.

In some implementations of the present technology, the lateral axis is disposed above the longitudinally extending axis.

In some implementations of the present technology, a pair of track tensioners operatively connects the pair of rear idler wheels to the pair of extension arms, the pair of track tensioners being disposed laterally between the pair of extension arms.

In some implementations of the present technology, a movable member is movable between a first position and a second position to adjust a magnitude of the biasing force.

In some implementations of the present technology, at least one blocking cam is mounted to one of the pair of slide rails and the pair of extension arms, the at least one blocking cam being movable between a first position and a second position to selectively prevent the pair of extension arms from pivoting from the lowered position to the raised position, and at least one stopper mounted to the other of the pair of slide rails and the pair of extension arms. When the pair of extension arms is in the lowered position, the at least one blocking cam is movable between: the first position, where the at least one blocking cam prevents the pair of extension arms from pivoting to the raised position; and the second position, where the at least one blocking cam permits the pair of extension arms to pivot to the raised position. When the at least one blocking cam is in the second position and the pair of extension arms is in the raised position, the at least one blocking cam abuts against the at least one stopper.

In some implementations of the present technology, a ball joint pivotally connects the lower end of the second suspension arm to the pair of slide rails about the longitudinally extending axis.

In some implementations of the present technology, the lateral axis is a first lateral axis. A rocker arm has an upper end and a lower end. The upper end of the rocker arm is pivotally connected to the lower end of the second suspension arm about a second lateral axis. The lower end of the rocker arm is pivotally connected to the pair of slide rails about a third lateral axis. The first lateral axis is vertically higher than the second lateral axis.

In some implementations of the present technology, the lateral axis is a first lateral axis. A rocker arm has an upper end and a lower end. The upper end of the rocker arm is pivotally connected to the lower end of the second suspension arm about a second lateral axis. The lower end of the rocker arm is pivotally connected to the pair of slide rails about a third lateral axis. The upper end of the first suspension arm is adapted to be pivotally connected to the tunnel about a fourth lateral axis. The pair of rear idler wheels is rotationally connected to the rear portion of the pair of extension arms about a wheel axis. When the pair of extension arms is in the lowered position, the wheel axis is disposed below the longitudinally extending axis and above a longitudinally extending line passing through the second and fourth lateral axes. When the pair of extension arms is in the raised position, the wheel axis is disposed above the longitudinally extending axis and the longitudinally extending line.

In some implementations of the present technology, at least one pair of caps connects to at least one of a front end a rear end of the pair of slide rails.

According to another aspect of the present technology, there is provided a method of replacing a pair of slide rails of a rear suspension assembly of a snowmobile is provided. The snowmobile has a chassis including a tunnel, the tunnel having a longitudinal direction, an engine connected to the chassis, at least one ski connected to the chassis by a front suspension, and an endless drive track disposed below the tunnel and operatively connected to the engine for propulsion of the snowmobile. The rear suspension assembly supports and tensions the endless drive track. The chassis is pivotally connected to the endless drive track via the rear suspension assembly about a longitudinally extending axis. The rear suspension assembly includes a first suspension arm having an upper end and a lower end, the upper end of the first suspension arm being pivotally connected to the tunnel and the lower end of the first suspension arm being connected to the pair of slide rails, a second suspension arm having an upper end and a lower end, the upper end of the second suspension arm being pivotally connected to the tunnel and the lower end of the second suspension arm being connected to the pair of slide rails, at least one shock absorber connected between the tunnel and the pair of slide rails, the at least one shock absorber biasing the pair of slide rails away from the tunnel, and a pair of rear idler wheels rotationally connected to a rear portion of the pair of slide rails for guiding the endless drive track. The pair of rear idler wheels rotates about a first wheel axis disposed at a first distance from a front of the pair of slide rails. The pair of slide rails is a first pair of slide rails. The first pair of slide rails has a first length. The method comprises: disconnecting the first pair of slide rails from the lower end of the first suspension arm, the lower end of the second suspension arm, the at least one shock absorber and the pair of rear idler wheels; pivotally connecting a second pair of slide rails to the lower end of the first suspension arm; pivotally connecting the second pair of slide rails to the lower end of the second suspension arm; connecting the second pair of slide rails to the at least one shock absorber; pivotally connecting a pair of extension arms to a rear portion of the second pair of slide rails about a lateral axis, the pair of extension arms being pivotable between a raised position and a lowered position with respect to the second pair of slide rails about the lateral axis; rotationally connecting the pair of rear idler wheels to a rear portion of the pair of extension arms about a second wheel axis, the second wheel axis being disposed at a second distance from a front of the second pair of slide rails when the pair of extension arms is in the lowered position; and operatively connecting at least one spring to the pair of extension arms for biasing the pair of extension arms toward the lowered position by exerting thereon a biasing force. The second pair of slide rails has a second length. The second length being less than the first length. The second distance is equal to the first distance.

In some implementations of the present technology, the lateral axis is disposed above the longitudinally extending axis.

In some implementations of the present technology, rotationally connecting the pair of rear idler wheels to the rear portion of the pair of extension arms includes disposing the pair of rear idler wheels laterally between the pair of extension arms.

In some implementations of the present technology, the method further comprises removing slider shoes from the first pair of slide rails; cutting the slider shoes to adapt the slider shoes to the second length of the second pair of slide rails; and connecting the cut slider shoes to the second pair of slide rails.

According to another aspect of the present technology, there is provided a slide rails replacement kit for replacing a pair of slide rails of a rear suspension assembly of a snowmobile is provided. The snowmobile has a chassis including a tunnel, the tunnel having a longitudinal direction, an engine connected to the chassis, at least one ski connected to the chassis by a front suspension, and an endless drive track disposed below the tunnel and operatively connected to the engine for propulsion of the snowmobile. The rear suspension assembly supports and tensions the endless drive track. The chassis is pivotally connected to the endless drive track via the rear suspension assembly about a longitudinally extending axis. The rear suspension assembly includes a first suspension arm having an upper end and a lower end, the upper end of the first suspension arm being pivotally connected to the tunnel and the lower end of the first suspension arm being connected to the pair of slide rails, a second suspension arm having an upper end and a lower end, the upper end of the second suspension arm being pivotally connected to the tunnel and the lower end of the second suspension arm being connected to the pair of slide rails, at least one shock absorber connected between the tunnel and the pair of slide rails, the at least one shock absorber biasing the pair of slide rails away from the tunnel, and a pair of rear idler wheels rotationally connected to a rear portion of the pair of slide rails for guiding the endless drive track, the pair of rear idler wheels rotating about a first wheel axis disposed at a first distance from a front of the pair of slide rails. The pair of slide rails is a first pair of slide rails. The first pair of slide rails has a first length. The kit has a second pair of slide rails adapted to be pivotally connected to the lower end of the first suspension arm and to the lower end of the second suspension arm, and to be connected to the at least one shock absorber, the second pair of slide rails being intended for replacing the first pair of slide rails of the snowmobile, a pair of extension arms adapted to be pivotally connected to a rear portion of the second pair of slide rails about a lateral axis, the pair of extension arms, once connected to the pair of slide rails, being pivotable between a raised position and a lowered position with respect to the second pair of slide rails about the lateral axis, a rear portion of the extension arms being adapted to rotationally connect the pair of rear idler wheels about a second wheel axis. Once the pair of extension arms is connected to the pair of slide rails, the second wheel axis is disposed at a second distance from a front of the second pair of slide rails when the pair of extension arms is in the lowered position. The kit also has at least one spring adapted to be operatively connected to the pair of extension arms for biasing the pair of extension arms toward the lowered position by exerting thereon a biasing force once the pair of extension arms is connected to the pair of slide rails. The second pair of slide rails has a second length. The second length is less than the first length. The second distance is equal to the first distance.

In some implementations of the present technology, the pair of slide rails and the pair of extension arms are adapted to locate the lateral axis above the longitudinally extending axis once the kit is installed on the snowmobile.

In some implementations of the present technology, the pair of extension arms is adapted to rotationally connect the pair of rear idler wheels laterally between the pair of extension arms.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the tunnel or the suspension assemblies for example, should be understood as they would be understood when these components or sub-assemblies are mounted to the vehicle.

Embodiments of the present technology each have at least one of the above-mentioned object and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 is a perspective view taken from a rear, left side of components of a slide rails replacement kit for replacing a pair of slide rails of a rear suspension assembly shown in an assembled state;

DETAILED DESCRIPTION

Figure 1:
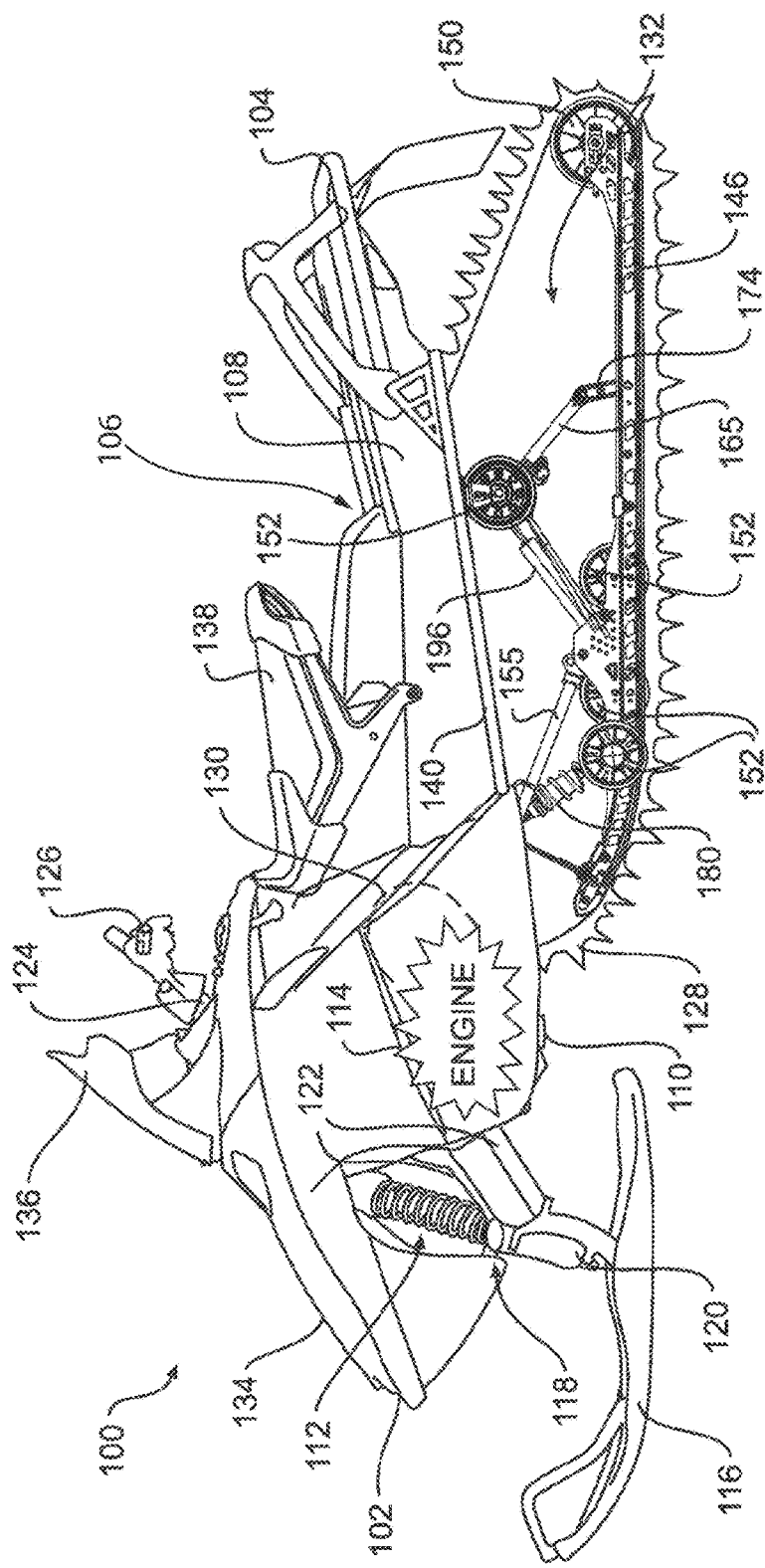
FIG. 1 is a left side elevation view of a snowmobile.

Referring to FIG. 1, a snowmobile 100 will be described. Although a snowmobile is presented herein. It is contemplated that aspects of the present rear suspension assembly could be applied to other types of tracked vehicles.

The snowmobile 100 includes a front end 102 and a rear end 104, which are defined consistently with the forward travel direction of the vehicle. The snowmobile 100 includes a chassis 106. The chassis 106 includes a tunnel 108, an engine cradle portion 110 and a front suspension assembly portion 112. An engine 114 (schematically shown) is carried by the engine cradle portion 110 of the chassis 106. A ski and steering assembly is provided, in which two skis 116 (only one of which is shown) are positioned at the front end 102 of the snowmobile 100, and are attached to the front suspension assembly portion 112 of the chassis 106 through a front suspension assembly 118. The front suspension assembly 118 includes ski legs 120, supporting arms 122 and ball joints for operatively joining the respective ski legs 120, supporting arms 122 and a steering column 124. The steering column 124 is attached at its upper end to a steering device, in this case a handlebar 126, which is positioned forward of a rider and behind the engine 114 to rotate the ski legs 120 and thus the skis 116, in order to steer the vehicle. It is contemplated that the snowmobile 100 could have only one ski 116.

An endless drive track 128 is positioned at the rear end 104 of the snowmobile 100 and is disposed under the tunnel 108. The endless drive track 128 is operatively connected to the engine 114 through a belt transmission system 130 (schematically shown). Thus, the endless drive track 128 is driven to run about a rear suspension assembly 132 for propulsion of the snowmobile 100. The rear suspension assembly 132 has a lateral direction 1 and a longitudinal direction 2 (both shown in FIG. 2). The rear suspension assembly 132 will be described in greater detail below.

At the front end 102 of the snowmobile 100, there are provided fairings 134 that enclose the engine 114 and the belt transmission system 130, thereby providing an external shell that not only protects the engine 114 and the belt transmission system 130, but also make the snowmobile 100 more aesthetically pleasing. The fairings 134 include a hood and one or more side panels, at least some of which can be opened to access to the engine 114 and the belt transmission system 130 when this is required. Easy access may be required for example for inspection or maintenance of the engine 114 and/or the belt transmission system 130. A windshield 136 is connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 is connected to and disposed on the tunnel 108. A rear portion of the seat 138 may include a storage compartment, or may be used to accept a passenger seat. Two foot rests 140 (see FIG. 5) are positioned on opposed sides of the tunnel 108 below the seat 138 to accommodate the rider's feet.

The endless drive track 128 is engaged with and driven by a drive sprocket (not shown) which is journaled by the tunnel 108 and is driven by the engine 114 through the belt transmission system 130. The endless drive track 128 is suspended for movement relative to the chassis 106, by the rear suspension assembly 132, as will be described below.

The snowmobile 100 includes other components which will not be described in detail herein.

Referring to FIGS. 2 to 5, a first embodiment of the rear suspension assembly 132 will now be described.

Figure 2:
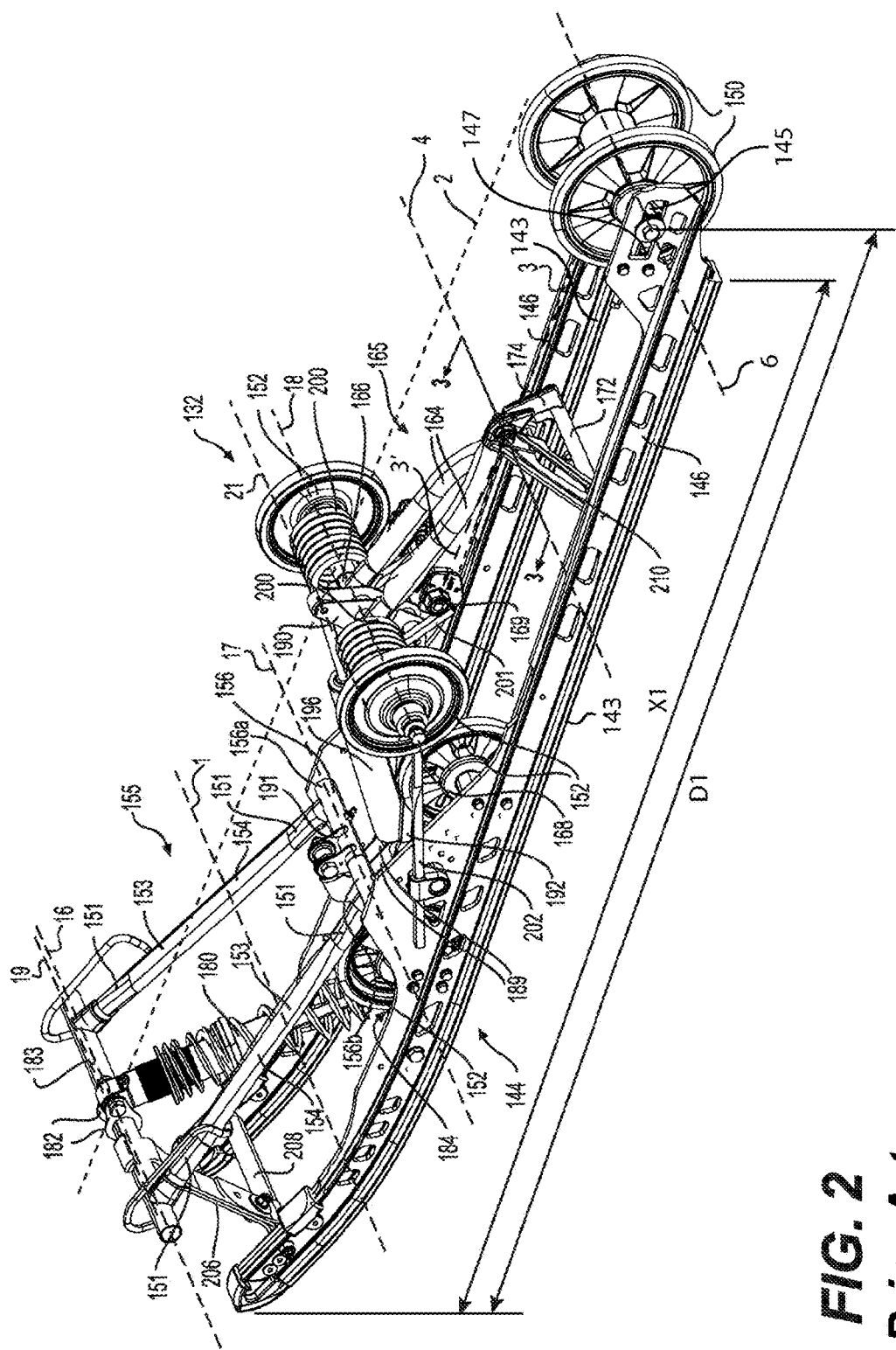
FIG. 2 is a perspective view taken from a rear, left side of a rear suspension assembly of the snowmobile of FIG. 1.

The rear suspension assembly 132 includes a slide frame assembly 144 which includes a pair of spaced apart slide rails 146 that engage the inner side of the endless drive track 128. The slide rails 146 have a length X1 (FIG. 2). The slide rails 146 are provided with slider shoes 143 on lower surfaces thereof. The slide frame assembly 144 journals two rear idler wheels 150 laterally between the slide rails 146. The rear idler wheels 150 are rotationally connected to a shaft 145 that extends through windows 147 defined in the rear portion of the slide rails 146. Fasteners hold the shaft 145 in place. The wheels 150 rotate about a wheel axis 6. Track tensioners 149 (not shown in FIG. 2) are connected to lateral inner sides of the slide rails 146 and to the shaft 145. The track tensioners 149 are used to move the shaft 145 inside the windows 147 to change the distance D1 (FIG. 2) between the wheel axis 6 and the front of the pair of slide rails 146, thereby changing the tension in the track 128. In addition, further wheels 152 are carried by the tunnel 108 and the slide rails 146 (some of which have been omitted in the Figures for clarity), in order to define the path over which the endless drive track 128 travels.

Figure 4:
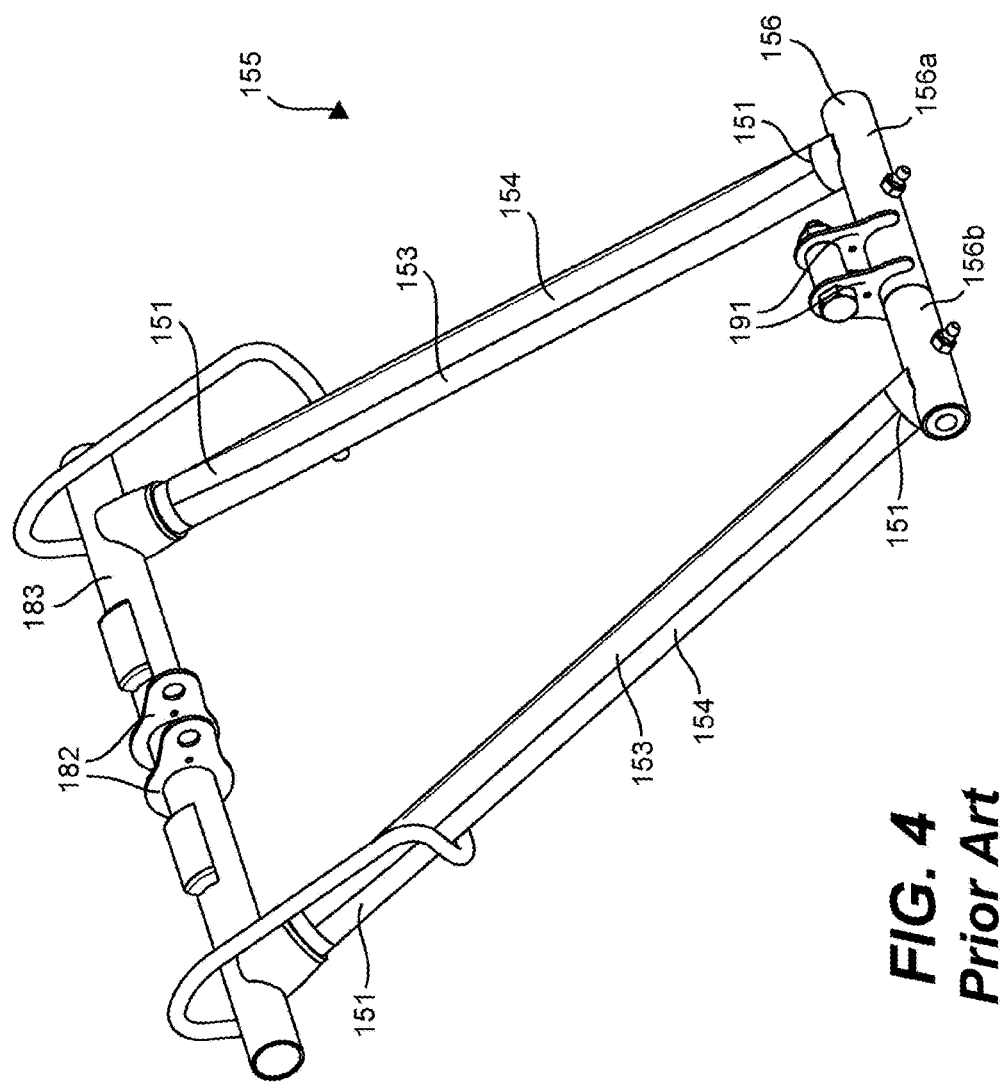
FIG. 4 is a perspective view taken from a rear left side of the rear suspension assembly of FIG. 2.

As can be seen in FIG. 4, a front suspension arm 155 includes two front arms 154, a tube 183, and a tube 156. It is contemplated that the front suspension arm 155 could have more or less elements than described above. For example, the front suspension arm 155 could have only one front arm 154.

As can be seen in FIG. 2, the front arms 154 extend downwardly and rearwardly from a front portion of the tunnel 108. Upper ends of the front arms 154 are pivotally attached to the tunnel 108 via the tube 183 so as to pivot about a lateral axis 16. The tube 183 is welded to the front arms 154 and extends therebetween. The lower ends of the front arms 154 are each pivotally attached to their respective slide rails 146 of the slide frame assembly 144 via the tube 156 so as to pivot about a lateral axis 17. The tube 156 is cut into two portions: a right portion 156a and a left portion 156b. This reduces the torsional rigidity of the front suspension arm 155. The movement of front portions of the slide rails 146 relative to the tunnel 108 of the chassis 106 causes the front arms 154 to rotate relative to the tunnel 108 about a lateral axis.

As best seen in FIG. 4, the front arms 154 have an arm body 153 that has flattened top and bottom surfaces, and ends 151 that have a cross-section transitioning from a flattened cross-section of the arm body 153 to a round cross-section for connection to the tube 183 and tube 156. As a result, the front arms 154 have a smaller moment of inertia near their centers than at their ends 151. It is contemplated that the front arms 154 could not have the flattened top and bottom surfaces. For example, the front arms 154 could have a generally circular cross-section throughout. The front arms 154 are made of metal tubes. It is also contemplated that the front arms 154 could be made of a material other than metal.

The rear suspension arm 165 includes two rear arms 164, a tube 166 and a bracket 190. It is contemplated that the rear suspension arm 165 could have more or less elements than described above. For example, the rear suspension arm 165 could have only one rear arm 164.

The rear arms 164 extend downwardly and rearwardly from a rear portion of the tunnel 108, and are disposed rearward of the front arms 154. The rear arms 164 are made of metal tubes of a general circular cross-section. It is contemplated that the rear arms 164 could have other shapes of cross-section. It is also contemplated that the rear arms 164 could be of a material other than metal. The rear arms 164 are pivotally attached to the tunnel 108 of the chassis 106 by means of a tube and shaft assembly. The tube and shaft assembly includes the tube 166 rotatably supported by a shaft 168 which is mounted at the opposite ends thereof to the tunnel 108. The shaft 168 supports the wheels 152 supporting an upper portion of the endless drive track 128. Upper ends of the rear arms 164 are welded to the tube 166, so that the rear arms 164 are adapted to pivot about the shaft 168. The upper ends of the rear arms 164 pivot relative to the tunnel 108 about a lateral axis 18.

Lower ends of the rear arms 164 are welded together and are pivotally connected to a rocker arm 174 by a ball joint 210. The rocker arm 174 is an inverted V-shaped member pivotally connected to the slide rails 146 by a hollow-cross bar 172. The hollow cross bar 172 extends in the lateral direction 1 between the slide rails 146 and defines a lateral axis of rotation of the rocker arm 174. The ball joint 210 will be described below. It is contemplated that the lower ends of the rear arms 164 could not be welded together and would be each pivotally connected a corresponding rocker arm.

A front shock absorber assembly 180 disposed between the tunnel 108 (via the tube 183) and the slide frame assembly 144 extends rearwardly and downwardly from the front portion of the tunnel 108. The front shock absorber assembly 180 is disposed partially forward of the front arms 154 and completely forward of the axis 17. A lower end of the first shock absorber assembly 180 is disposed forwardly of the lower ends of the front arms 154. The front shock absorber assembly 180 is a damping unit which includes a hydraulic damper and a coil spring for absorbing the impact energy when impact forces are applied to the opposite ends of the damping unit. The coil spring biases the damping unit toward an extended position so that the hydraulic damper is in a position to absorb the impact energies. Since shock absorber assemblies of the type of the shock absorber assembly 180 are well known in the art, it will not be further described herein. It is contemplated that the hydraulic damper and/or the coil spring could be omitted.

The front shock absorber assembly 180 is operatively attached at an upper end thereof to the tunnel 108 by a shaft and front bracket assembly comprising the tube 183 and two brackets 182. The two brackets 182 are fixedly connected to the tube 183 near a center of the tube 183. The upper end of the front shock absorber assembly 180 is pivotally connected to the brackets 182 about a lateral axis 19 such that an axial force is applied to the upper end of the front shock absorber assembly 180 when the front arms 154 move with respect to the tunnel 108. The connection between the upper end of the front shock absorber assembly 180 and the brackets 182 provides some play between these parts such that the shock absorber assembly 180 can pivot (i.e. roll) slightly relative to the brackets 182 about a generally longitudinal axis.

The front shock absorber assembly 180 is pivotally connected to a lower end thereof to the slide frame assembly 144 via a shaft 184. A bearing or bushing (not shown) is disposed around the shaft 184 and inside an aperture (not shown) in the lower end of the front shock absorber assembly 180. The shaft 184 is fixedly connected to the left and right slide rails 146, extending between them in the lateral direction 1. The front shock absorber assembly 180 is adapted to rotate about the shaft 184. The bearing or bushing provides some play between the shaft 184 and the lower end of the front shock absorber assembly 180 such that the shaft 184 can pivot (i.e. roll) slightly relative to the lower end of the front shock absorber assembly 180 about a generally longitudinal axis. It is contemplated that the bearing or bushing could be replaced by a connector providing two or more degrees of freedom such as a ball joint for example. It is contemplated that the front shock absorber assembly 180 could be connected to other parts of the snowmobile 100.

The rear shock absorber 196 extends forwardly and downwardly from the rear portion of the tunnel 108, and is disposed at least in part rearwardly of the front arms 154. The rear shock absorber 196, similar to the hydraulic damper of the front shock absorber assembly 180, is well known in the art, and therefore will not be described in detail. The rear shock absorber 196 is pivotally connected at its upper end to the tunnel 108 about a lateral axis 21 via the rear an upper portion 190a (FIG. 3) of the bracket 190 mounted on the tube 166 and the shaft 168 assembly of the rear arms 164. The rear shock absorber 196 is pivotally connected at its lower end to generally L-shaped brackets 189. The L-shaped brackets 189 are pivotally connected to brackets 191 (best seen in FIG. 4) that are fixedly connected to the right portion 156a of the tube 156. Two rods 192 are pivotally connected at their upper ends to a lower portion 190b (FIG. 3) of the bracket 190 and at their lower ends to the L-shaped brackets 189. The lower ends of the rods 192 and of the rear shock absorber 196 are pivotally connected to the L-shaped brackets 189 about a common lateral pivot axis. The rear shock absorber 196 is disposed laterally between the rods 192.

The rear bracket 190 is fixedly connected to the tube 166. As mentioned above, the tube 166 is rotatable over the shaft 168. It is contemplated that the rear bracket 190 could be two rear brackets.

Left and right torsion springs 200 are provided in order to push the slide frame assembly 144 apart from the tunnel 108 of the chassis 106, and to maintain the front and rear shock absorber assemblies 180, 196 substantially in an extended condition when no substantial loads are applied thereon. The left and right torsion springs 200 surround the tube 166 at each end thereof. A first free end 201 (only one being shown in FIG. 2) of each of the torsion springs 200 abuts a corresponding knob 169, and a second free end 202 of each of the torsion springs 200 abuts the slide rails 146. The knob 169 can be rotated to adjust tension in the torsion springs 200.

Left and right flexible tension straps 206 (only the left one being shown in FIG. 2) are attached at their upper ends to the tube 183, and are attached at their lower ends to the slide frame assembly 144 by means of a cross bar 208 which extends between the slide rails 146 and is attached at its opposite ends to the front ends of the slide rails 146. The flexible tension straps 206 prevent the slide frame assembly 144 from being pushed too far away from the tunnel 108.

Figure 3:
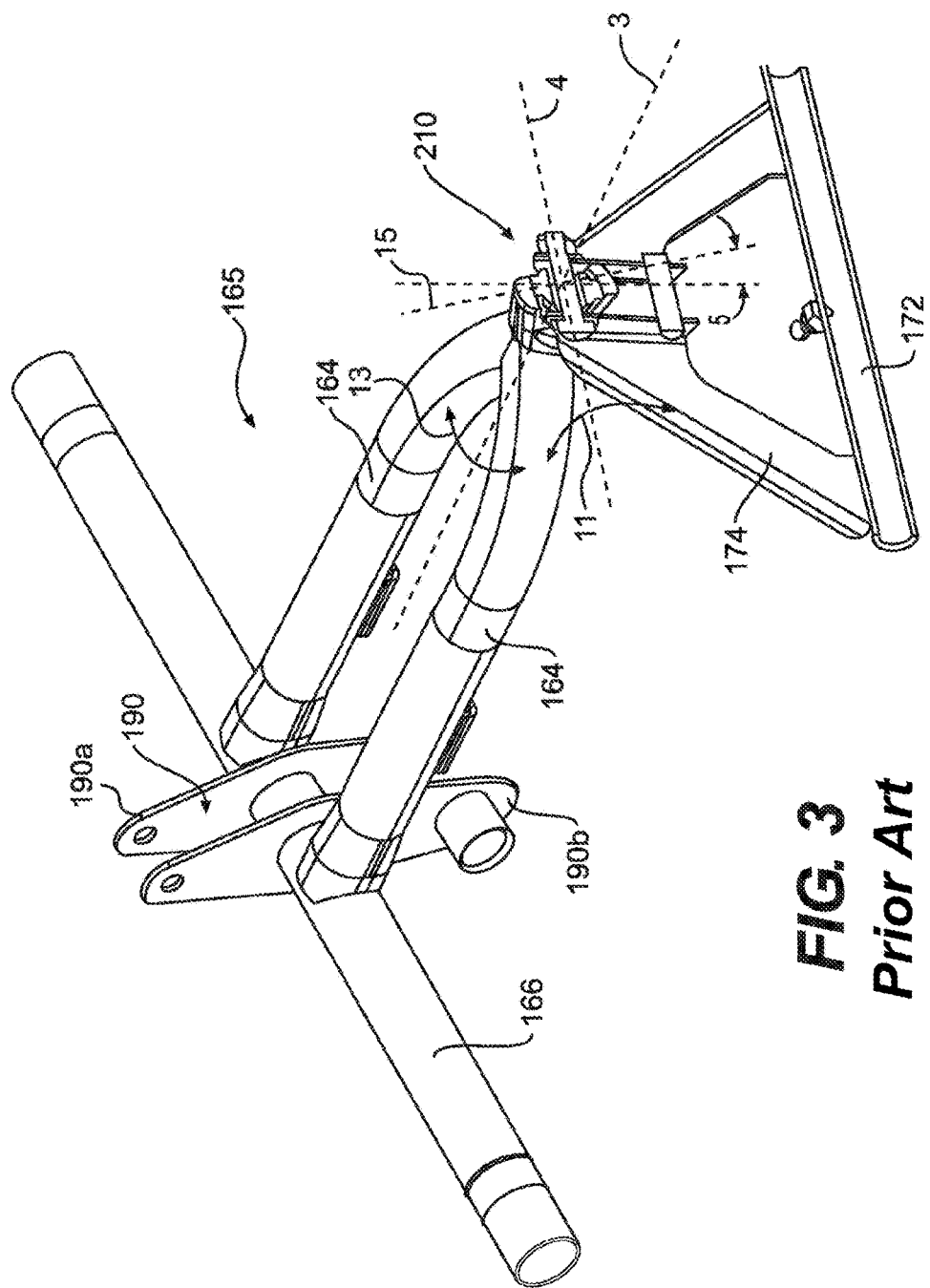
FIG. 3 is a cross-sectional view of a portion of the rear suspension assembly of FIG. 2 taken along line 3-3 of FIG. 2.

Turning now to FIG. 3, the ball joint 210 rotatably connecting the lower ends of the rear arms 164 to the rocker arm 174 will be described in more detail. The ball joint 210 is a two degrees of freedom joint which allows the lower ends of the rear arms 164 to rotate about a lateral axis 4 (as illustrated by arrow 11) and about a longitudinally extending axis 3 (as illustrated by arrow 13). The longitudinally extending axis 3 passes through axes 4 and 17 (FIG. 2) and is laterally centered between the slide rails 146. Since the axis 17 is fixed relative to the slide rails 146 and the axis 4 moves relative to the slide rails 146 as the suspension assembly 132 is compressed and extended (due to the movement of rocker arm 174), the longitudinally extending axis 3 pivots about the axis 17 as the suspension assembly 132 is compressed and extended. The ball joint 210 is a standard ball joint and details of its structure will not be described herein. In an alternative embodiment, the ball joint 210 rotates about a longitudinally extending axis 3' that passes through the axis 4 and slightly above the axis 17 (i.e. near a top of brackets 191) and is also laterally centered between the slide rails 146.

Figure 5:
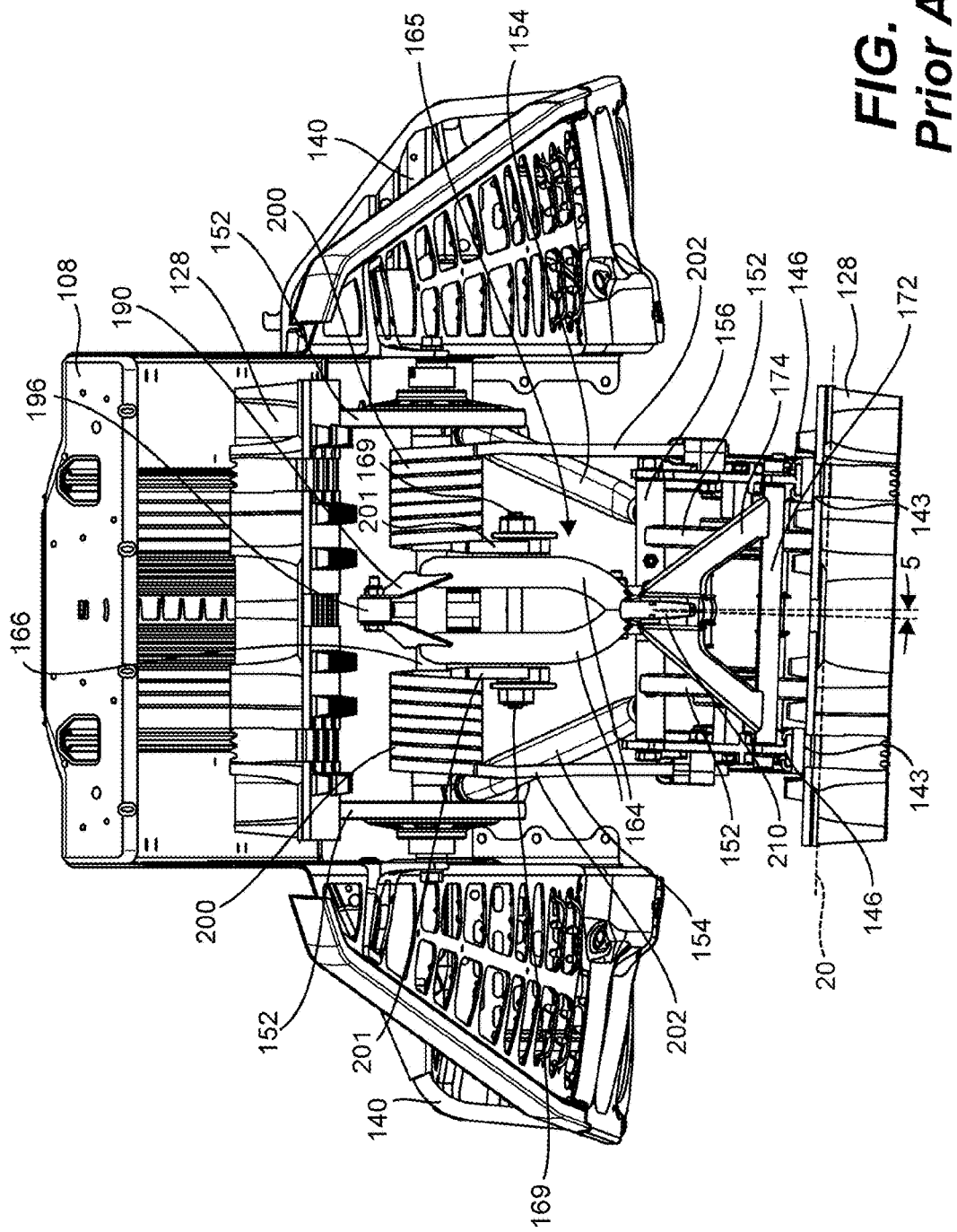
FIG. 5 is a lateral cross-section of a portion of the snowmobile of FIG. 1 having the suspension assembly of FIG. 2 shown while side-hilling.

Because the ball joint 210 allows the lower ends of the rear suspension arm 165 to rotate about the longitudinally extending axis 3 (or 3'), the rear suspension assembly 132 is allowed to roll generally about the longitudinally extending axis 3 (or 3'). The chassis 106 rolls relative to the drive track 128. This can occur for example, when side-hilling as shown in FIG. 5. When the snowmobile 100 is side-hilling, the ball joint 210 allows the tunnel 108 to remain substantially horizontal, while the slide rails 146 and the portion of the endless drive track 128 they abut (i.e. the ground contacting portion) pivot about the longitudinally extending axis 3 (or 3') so as to be disposed at an angle with respect to the tunnel 108 in order to remain in contact with a ground 20 having a moderate slope. When side-hilling, the wheels 150, 152 connected to the slide rails 146, the cross bars 172, 208, the shaft 184 and the rocker arm 174 also pivot about the longitudinally extending axis 3 (or 3') so as to be disposed at an angle with respect to the tunnel 108. FIG. 3 shows the ball joint 210 positioned such that the rocker arm 174 is at a roll angle 5 of 2 degrees with respect to a vertical 15. It is contemplated that the roll angle 5 could be between 0 and 10 degrees with respect to the vertical 15. It is also contemplated that the roll angle 5 could be between 0 and 3 degrees with respect to the vertical 15. It should be understood that should the slope of the ground be greater than the maximum roll angle 5 permitted by the ball joint 210, that the tunnel 108 and the elements connected thereto also lean relative to the vertical. It should also be understood that suspension assembly 132 allows the slide rails 146, the portion of the endless drive track 128 they abut, the wheels 150, 152 connected to the slide rails 146, the cross bars 172, 208 and the rocker arm 174 to remain generally parallel to the ground and permit the driver to cause the tunnel 108 and at least the portions of the snowmobile 100 connected directly thereto to roll about the longitudinally extending axis 3 (or 3') such as when leaning in a turn.

It is contemplated that the lower ends of the rear suspension arm 165 could be pivotally connected to a rocker arm 174 by a joint other than a ball joint. For example, the lower ends of the rear arms 164 could be pivotally connected to a rocker arm 174 about a lateral axis and a longitudinally extending axis by a universal joint. In another example, the lower ends of the rear arms 164 are pivotally connected to a rocker arm 174 by two one degree of freedom joints (one for the lateral direction 1 and one for the longitudinal direction 2) joined to each other in series. It is contemplated that the ball joint 210 could pivotally connect the rocker arm 174 to the slide rails 146, and that the rear arms 164 could be pivotally connected to the rocker arm 174 only about the lateral axis 4. It is contemplated that the rocker arm 174 could be omitted and the rear arms 164 could be pivotally connected directly to the cross bar 172 by the ball joint 210, a universal joint or two one degree of freedom joints joined to each other in series. It is also contemplated that the rocker arm 174 could be replaced by two rocker arms, one for each of the rear arms 164. It is contemplated that the ball joint 210 could pivotally connect to another part of the rear arms 164. For example, the ball joint 210 could pivotally connect the upper end of the rear arms 164 to the tunnel 108. Alternatively, each rear arm 164 could be made of two sections pivotally connected to each other so as to permit pivoting about a longitudinally extending axis.

As mentioned above, the front arms 154 have a variable cross-section. The variable cross-section alone or when combined with the split tube 156, allows the front arms 154 to be flexible about the longitudinally extending axis 3 (or 3') so as to permit rolling between the chassis 106 and the slide rails 146 when the rear suspension arm 165 rolls. It is also contemplated that slight roll of a portion of the front suspension arm 155 relative to the tunnel 108 could be achieved by ways other than modifying a cross-section of the front arms 154.

Alternative embodiments of the rear suspension assembly 132 are described in International Patent Publication Number WO 2013/016128 A1, published Jan. 31, 2013, the entirety of which is incorporated herein by reference.

Although the above rear suspension assembly 132 addresses the above mentioned issue of side-hilling, it still has the inconvenience of potentially having the rear portion of the track 128 digging into the snow when the snowmobile 100 moves in reverse.

To address this issue, a slide rails replacement kit 300 for replacing the pair of slide rails 146 of the rear suspension assembly 132 is provided. Once the rails 146 of the rear suspension assembly 132 have been replaced with the components of the kit 300 as will be described below, the rear suspension assembly 132 forms a rear suspension assembly 132'. It should be understood that it is contemplated that the snowmobile 100 could be provided directly with the rear suspension assembly 132' (i.e. it does not need to be first provided with the rear suspension assembly 132 and then be converted by kit 300 to the rear suspension assembly 132). It should also be understood that it is also contemplated that instead of only providing a kit 300 to convert the rear suspension assembly 132 to a rear suspension assembly 132', a complete rear suspension assembly 132' could be provided to attach to the snowmobile 100.

Figure 6:
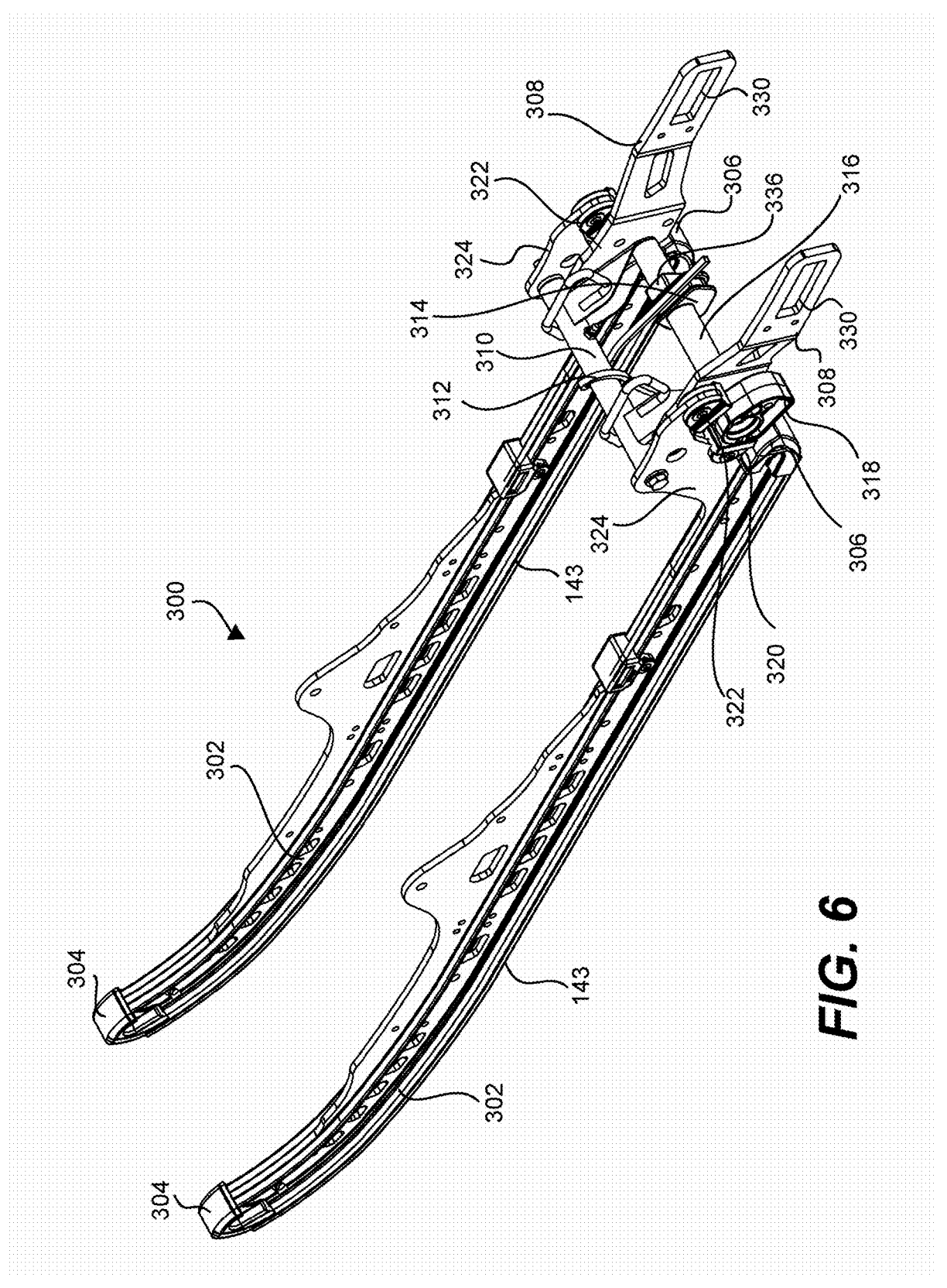
Figure 7:
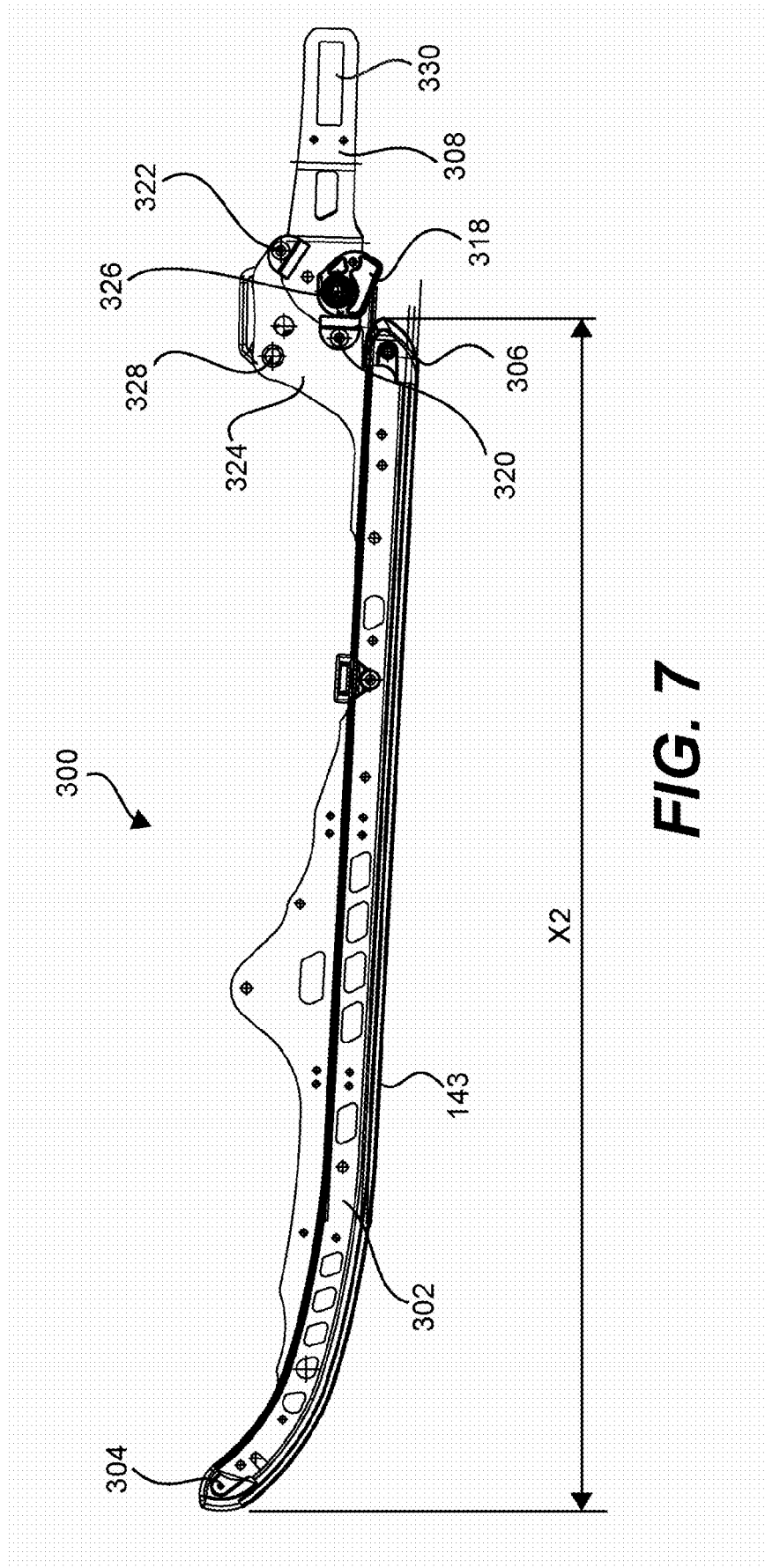
FIG. 7 is a left side elevation view of the assembled kit of FIG. 6.
Figure 8:
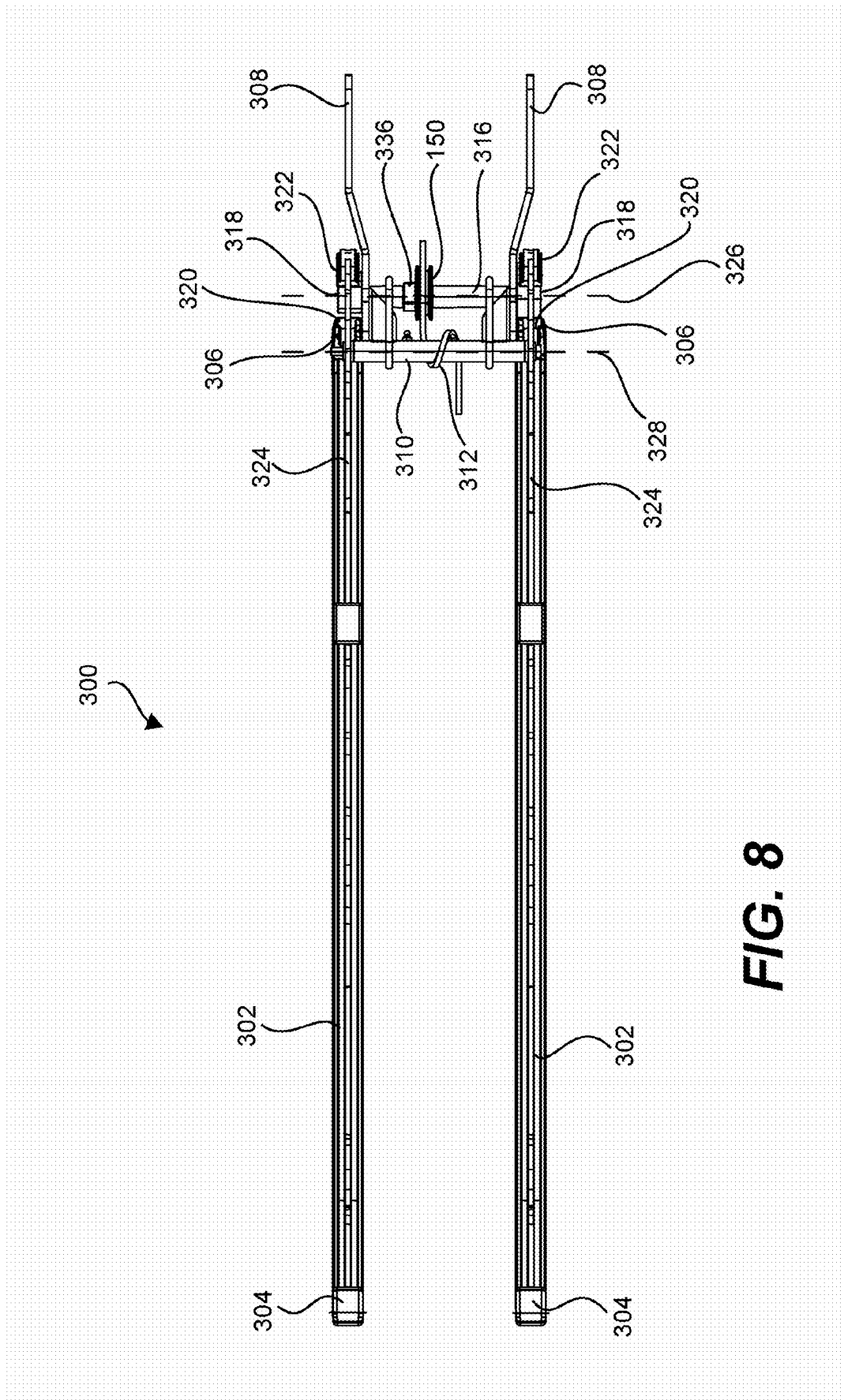
FIG. 8 is a top plant view of the assembled kit of FIG. 6.

Turning now to FIGS. 6 to 8, the components of the slide rails replacement kit 300 will be described. As can be seen in FIGS. 6 to 8, the components of the kit 300 are shown as being assembled to each other. This has been done in order to facilitate understanding. It should be understood that in the kit 300, the components would be disassembled from each other. However, it is contemplated that the kit 300 could also be provided as an assembled unit as shown.

The kit 300 includes a pair of slide rails 302, a pair of front caps 304, a pair of rear caps 306, a pair of extension arms 308 connected to a cross-member 310, a spring 312, an adjustment cam 314, a cross-member 316, a pair of blocker cams 318, a pair of lower stopper 320, a pair of upper stoppers 322, and fasteners necessary to the assembly of the kit 300. As will be understood from the explanation provided below, the kit 300 reuses the wheels 150, 152, track tensioners 149 and shaft 145 of the rear suspension assembly 132 and as such these components are not provided in the kit 300. However, it is contemplated that one or more of these components could be provided in the kit 300.

With reference to FIGS. 2 and 6 to 12, the method of replacing the slide rails 146 from the rear suspension assembly 132 with the components of the kit 300 to form the rear suspension assembly 132' will now be described.

The wheels 150, 152, track tensioners 149 and shaft 145 are disconnected and put aside to be reused later. The slide rails 146 are disconnected from the cross bar 208, the shaft 184 connected to the shock absorber 180, the tube 156 of the front suspension arm 155, the cross bar 172 of the rocker arm 174 connected to the rear suspension arm 165 and any other component connected to the slide rails 146. The slider shoes 143 are removed from the slide rails 146 and put aside to be reused later.

The front caps 304 are connected to the front ends of the slide rails 302. The rear caps 306 are connected to the rear ends of the slide rails 302. It is contemplated that the front and/or rear caps 304, 306 could be omitted. It is also contemplated that the front and/or rear caps 304, 306 could be integrally formed with the slide rails. The slider shoes 143 are cut to adapt them to a length of the slide rails 302 and are then connected to the bottom surfaces of the slide rails 302. One lower stopper 320 and one upper stopper 322 are connected to the laterally outer side of a rear extension 324 of each slide rail 302 in the position shown. The lower stoppers 156 and the upper stoppers 158 are coated on one side thereof with a resilient material, such as rubber, to cushion impacts.

As can be seen, the slide rails 302 have a length X2 (FIG. 7) that is shorter than the length X1 of the slide rails 146, but they are long enough to reconnect to the remaining components of the of the rear suspension assembly 132. The slide rails 302 are pivotally or fixedly, as the case may be, connected to the cross bar 208, the shaft 184 connected to the shock absorber 180, the tube 156 of the front suspension arm 155, the cross bar 172 of the rocker arm 174 connected to the rear suspension arm 165 and any other component to which the slide rails 146 were connected. The wheels 152 are then rotationally connected to the slide rails 302 in the same position that they had on the slide rails 146.

The adjustment cam 314 is mounted on the cross-member 316. The cross-member 316 defines an axis of rotation 326 about which the adjustment cam 314 can be pivoted as will be described below. The cross-member 316 is pivotally connected laterally between the extension arms 308. The blocker cams 318 are pivotally connected to the ends of the cross-member 316 and are disposed laterally outward of the extension arms 308. The blocker cams 318 are also pivotable about the axis of rotation 326 as will be described below. The spring 312 is disposed around the cross-member 310 and one end thereof is disposed on the adjustment cam 314 as shown. The extension arms 308 are then pivotally connected via the cross-member 310 to the rear extension 324 of the slide rails 302 such that the cross-member 320, the extension arms 308, the cross-member 316, the adjustment cam 314, and the blocker cams 318 can pivot as a unit about a lateral axis 328. The end of the spring 312 which is not disposed on the adjustment cam 314 is disposed on the cross bar 172.

The rear idler wheels 150 are rotationally connected to the shaft 145 which is disposed so as to extend through windows 330 defined in the rear portion of the extension arms. Fasteners hold the shaft 145 in place. The wheels 150 rotate about a wheel axis 332. The track tensioners 149 are connected to lateral inner sides of the extension arms and to the shaft 145. The track tensioners 149 are used to move the shaft 145 inside the windows 330 to change the distance D2 (FIG. 11) between the wheel axis 332 and the front on the pair of slide rails 302, thereby changing the tension in the track 128. The track tensioners 149 are adjusted such that when the extension arms 308 are in the position shown in FIGS. 9 to 12 (i.e. the lowered position as will be described below), the distance D2 between the wheel axis 332 and the front of the slide rails 302 is the same as the distance D1 that existed between the wheel axis 6 and the front of the slide rails 146. Also, the windows 330 are disposed such that when the extension arms 308 are in the position shown in FIGS. 9 to 12, the vertical distance between the wheel axis 332 and the bottom surfaces of the slide rails 302 is the same as the vertical distance between the wheel axis 6 and the bottom surfaces of the slide rails 146.

Figure 10:
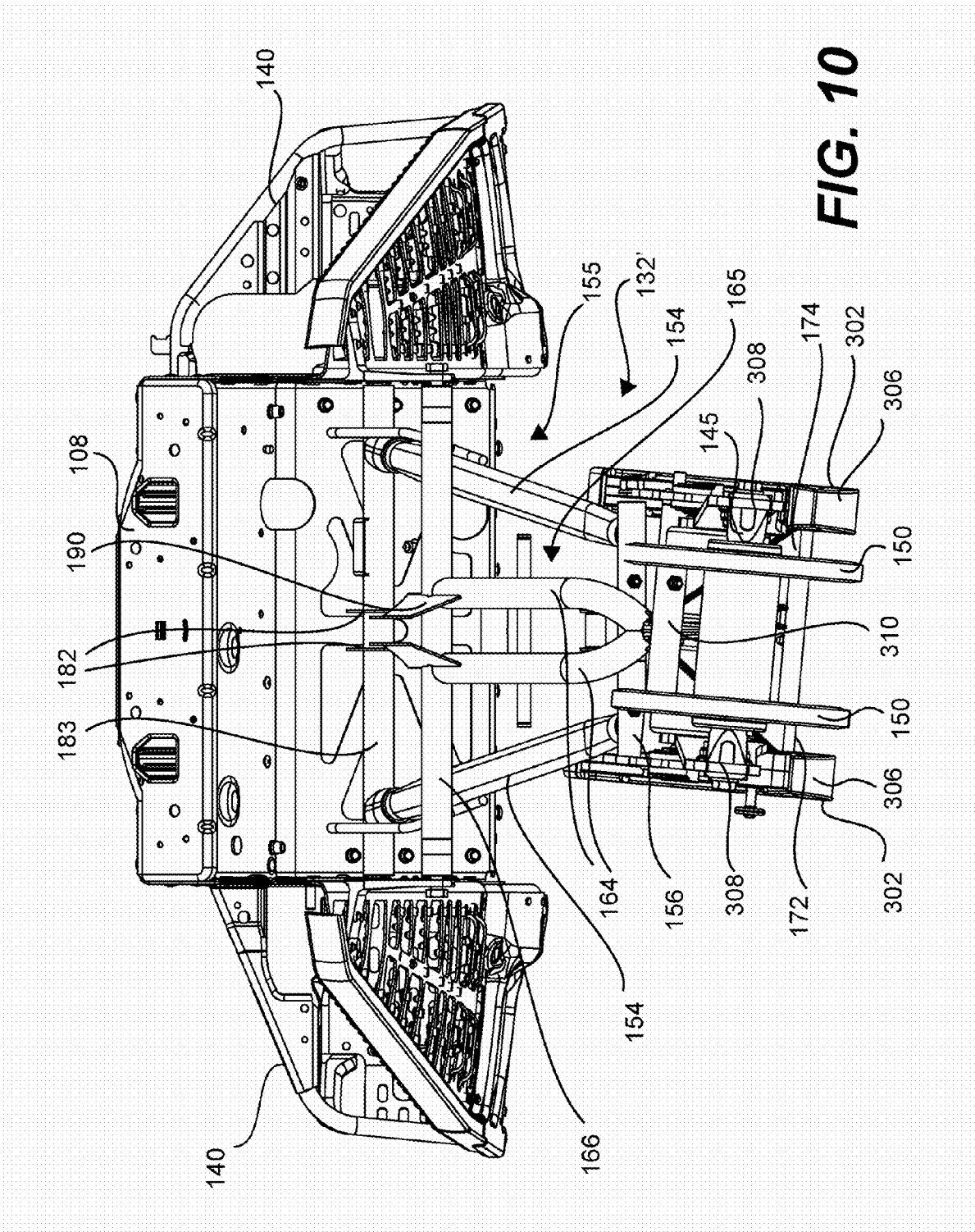
FIG. 10 is a rear elevation view of the tunnel and rear suspension assembly of FIG. 9 shown while side-hilling, with some components of the rear suspension assembly removed for clarity.

The assembly is thus completed and the rear suspension assembly 132 is now the rear suspension assembly 132'. As can be seen in FIG. 10, the rear suspension assembly 132' still allows the chassis 106 to roll about the longitudinally extending axis 3 (or 3') relative to the drive track 128, thus addressing the issue of side-hilling. Additionally, as will be described below, the addition of the pivotable extension arms 308 addresses the issue of the rear portion of the track 128 digging into the snow when the snowmobile 100 moves in reverse.

Although a particular order of steps has been provided above, it should be understood that it is contemplated that the order of the steps could be changed. For example, components of the kit 300 could be assembled together before the rails 146 are disconnected from the rest of the suspension assembly 132.

Turning now to FIGS. 9 to 13, additional detail regarding the rear suspension assembly 132' will be described.

Figure 11:
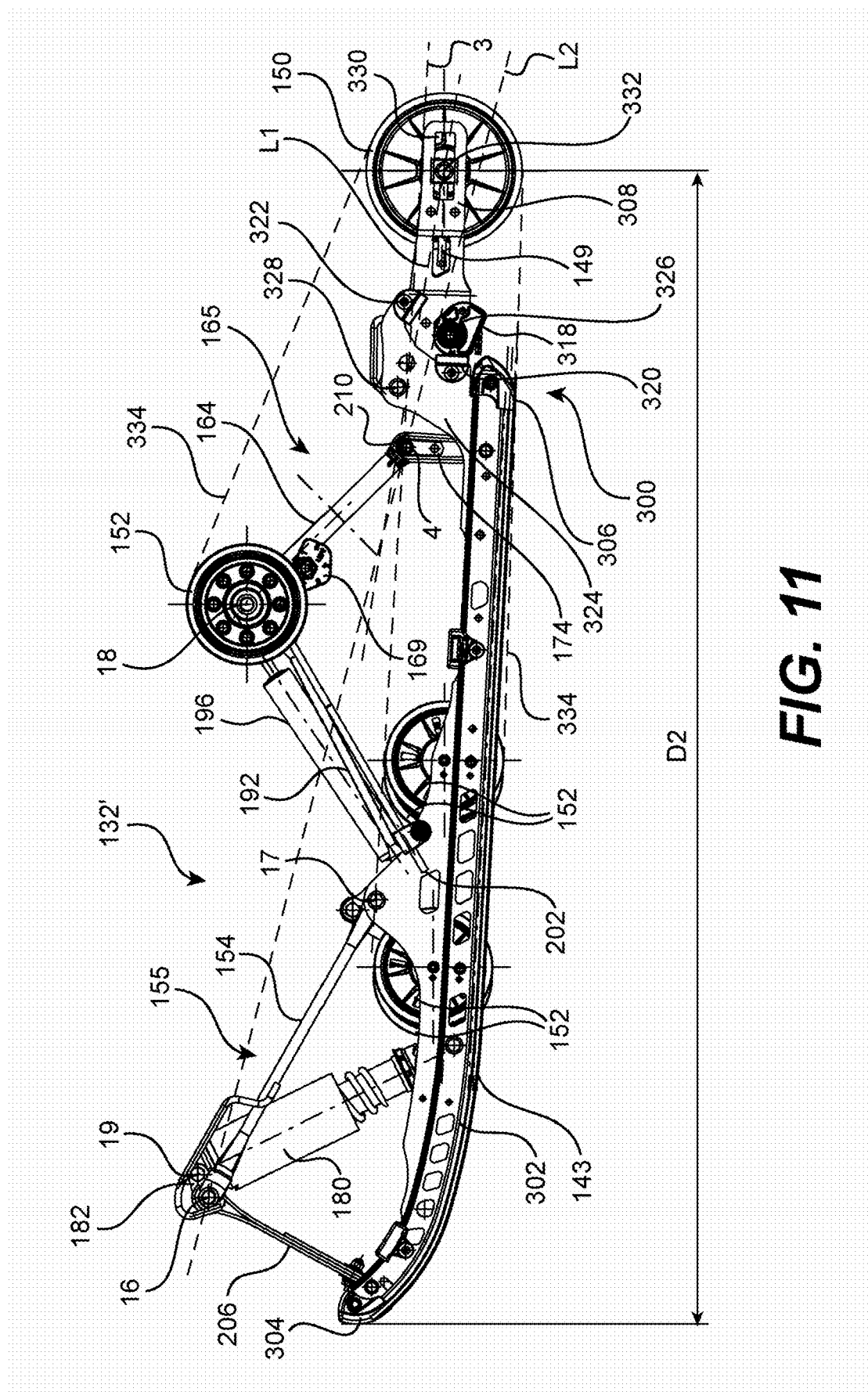
FIG. 11 is a left side elevation view of the rear suspension assembly of FIG. 9.
Figure 12:
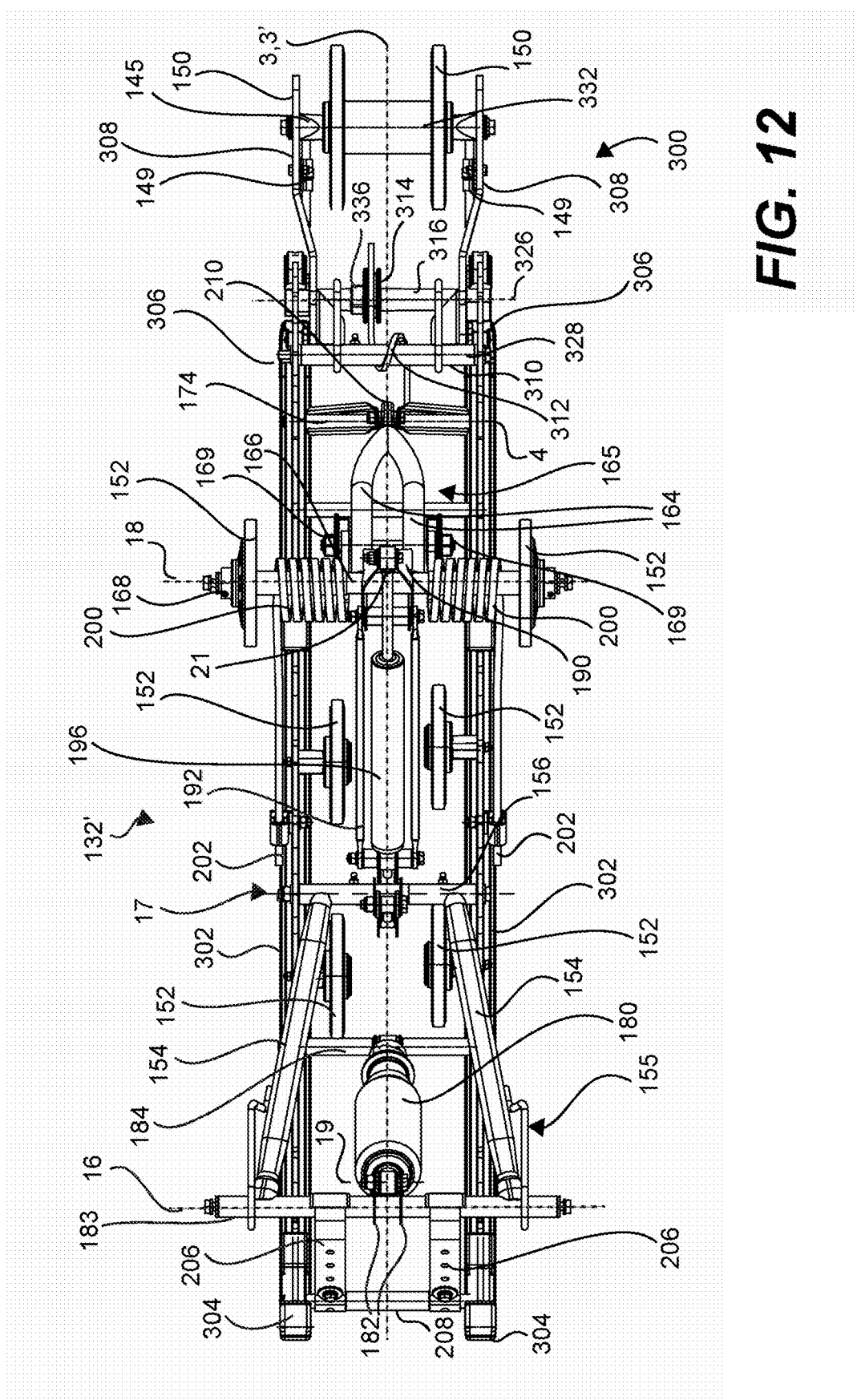
FIG. 12 is a top plan view of the rear suspension assembly of FIG. 9.
Figure 13:
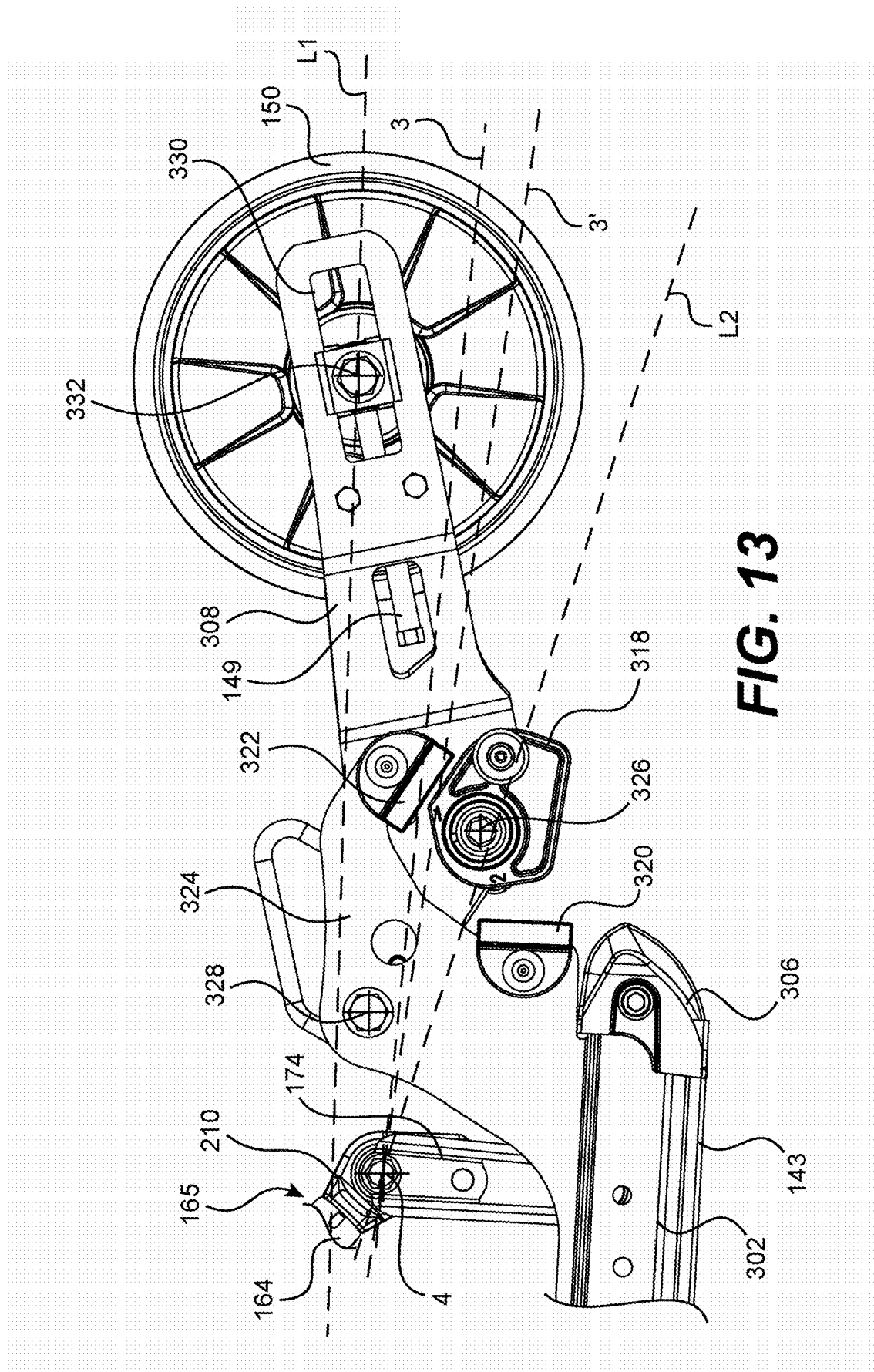
FIG. 13 is a close-up view of a rear, left side of the rear suspension assembly of FIG. 9 with the pair of extension arms shown in a raised position.

The extension arms 308 can pivot between a lowered position (seen in FIGS. 9 to 12) and a raised position (seen in FIG. 13). As can be seen in FIG. 11, a line L1 passes through the center of the rear idler wheels 150 (i.e. the wheel axis 332) and bisects the angle between the top and bottom portions 334 of the track 128 extending forward from the rear idler wheels 150. When the extension arms 308 are in the lowered position, the lateral axis 328 is higher than the line L1 to ensure that the forces exerted on the rear idle wheels 150 by the track 128 will tend to force the rear idler wheels 150 towards the ground. Also, a line L2 (FIG. 11) passes longitudinally through the axes 16 and 4. When the extension arms 308 are in the lowered position and the snowmobile 100 is at rest on level ground with no rider or cargo thereon, the wheel axis 332 is disposed below the longitudinally extending axis 3 and above the line L2 and the lateral axis 328 is disposed above the longitudinally extending axis 3 as can be seen in FIG. 11. As can be seen in FIG. 13, when the extension arms 308 are in the raised position and the snowmobile 100 is at rest on level ground with no rider or cargo thereon, the lateral axis 328 is lower than the line L1 to ensure that the forces exerted on the rear idle wheels 150 by the track 128 will tend to force the rear idler wheels 150 away from the ground and the wheel axis 332 is disposed above both the longitudinally extending axis 3 and the line L2.

Figure 9:
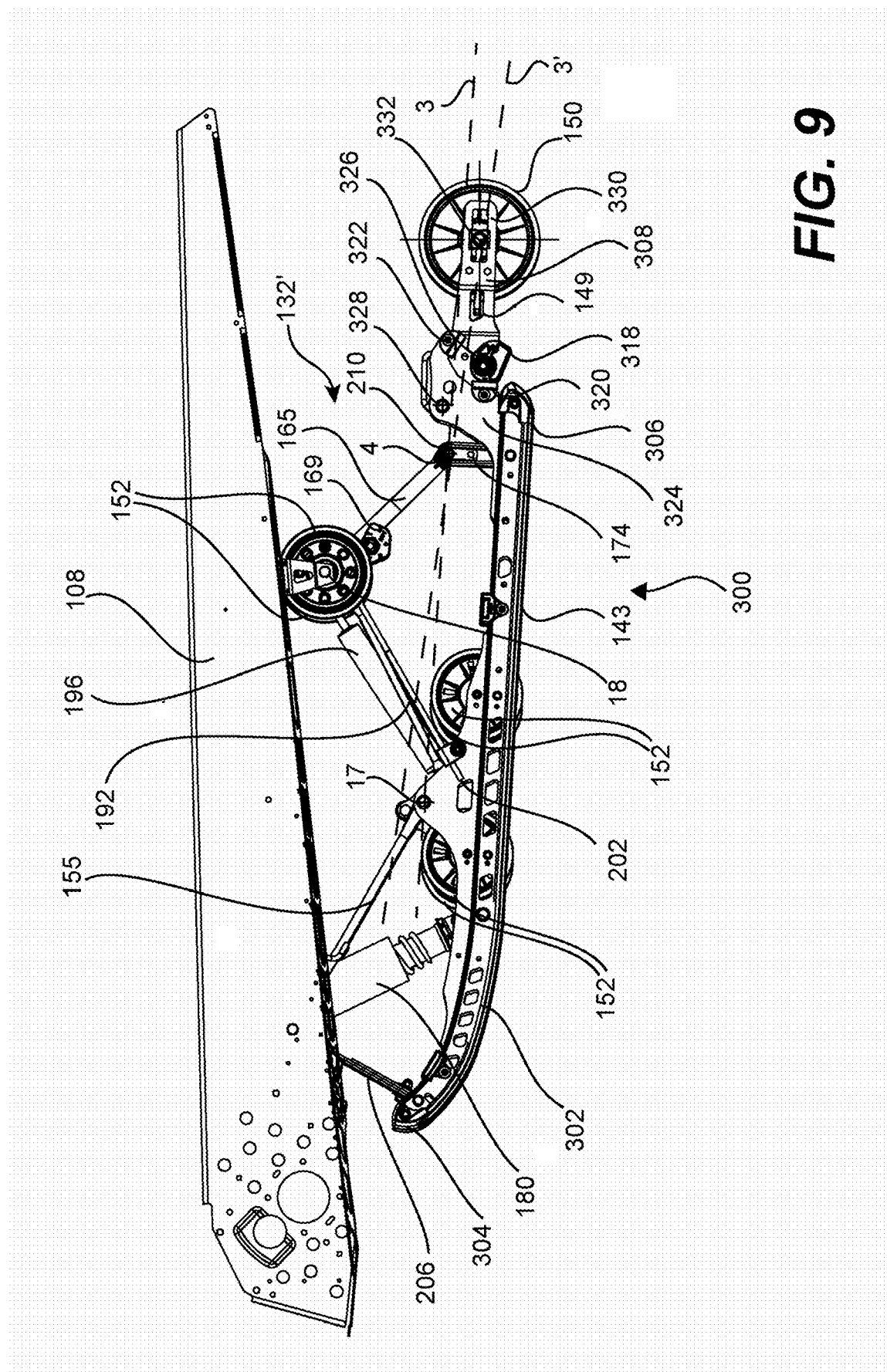
FIG. 9 is a left side elevation view of a tunnel and rear suspension assembly of the snowmobile of FIG. 1 with the slide rails of the rear suspension assembly replaced with the components of the slide rails replacement kit and with a pair of extension arms thereof shown in a lowered position.

In the embodiment where the ball joint 210 pivots about the longitudinal axis 3' (FIG. 9), when the extension arms 308 are in the lowered position and the snowmobile 100 is at rest on level ground with no rider or cargo thereon, the wheel axis 332 is disposed below the longitudinally extending axis 3' and above the line L2 and the lateral axis 328 is disposed above the longitudinally extending axis 3' as can be seen in FIG. 9. When the extension arms 308 are in the raised position and the snowmobile 100 is at rest on level ground with no rider or cargo thereon, the wheel axis 332 is disposed above both the longitudinally extending axis 3' and the line L2 as can be seen in FIG. 13.

As can be seen in FIG. 9, when the snowmobile 100 is at rest on level ground with no rider or cargo thereon, both longitudinally extending axes 3, 3' will intersect the ground on which the snowmobile 100 rests at a position rearward of the snowmobile 100 and therefore rearward of the lateral axis 328 and the wheels 150. Also, as can be seen in FIG. 12, when the snowmobile 100 is at rest on level ground with no rider or cargo thereon, both longitudinally extending axes 3, 3' are laterally centered between the slide rails 302, the extension arms 308 and the wheels 150.

As previously mentioned, one end of the spring 312 abuts against the cross bar 172 and the other end of the spring 312 abuts against the adjustment cam 314 mounted on the cross member 316. In this manner, the spring 312 biases the extension arms 308 downward toward the lowered position.

The adjustment cam 314 has an asymmetric shape, such that some portions of the edge of the adjustment cam 314 are closer to the axis of rotation 326, and other portions of the edge of the adjustment cam 314 are farther from the axis of rotation 326. The shape of the cam 314 allows a rider to adjust the magnitude of the biasing force exerted on the extension arms 308 by the spring 312. If the rider desires a stronger biasing force, he can rotate the adjustment cam 314 so that an external surface of the adjustment cam 314 farther from the axis of rotation 326 abuts against the spring 312. In this orientation, the adjustment cam 314 increases the compression of the spring 312, thus increasing the magnitude of the biasing force exerted by the spring 312. Similarly, if the rider desires a weaker biasing force, he can rotate the adjustment cam 314 so that an external surface of the adjustment cam 314 closer to the axis of rotation 326 abuts against the spring 312. In this orientation, the adjustment cam 314 partially reduces the compression of the spring 312, thus decreasing the magnitude of the biasing force exerted by the spring 312.

The adjustment cam 314 is provided with a lateral extension 336 suitable for being gripped by a wrench or similar tool, to allow the rider to rotate the adjustment cam 314 about the axis 326 to adjust the biasing force of the spring 312. The axis 326 is parallel to the lateral axis 328 in this embodiment.

In the present embodiment, a single spring 312 and a single adjustment cam 314 are used. This arrangement allows simple and convenient adjustment of the biasing force because only a single adjustment cam 314 needs to be rotated. It is contemplated, however that two or more springs 312, and a corresponding number of adjustment cams 314 could be provided. In the case of more than one adjustment cam 314, the adjustment cams 314 can be mechanically coupled so that rotating one adjustment cam 314 causes the other adjustment cams 314 to rotate as well, thus necessitating only a single rotation to adjust the biasing force of all of the springs 312.

When the snowmobile 100 is operated in the reverse direction, the terrain encountered by the portion of the track 128r in the vicinity of the rear idler wheels 150 exerts an upward force on the rear idler wheels 150. The rear idler wheels 150 transmit this force to the extension arms 308, thereby urging the extension arms 308 toward the raised position (seen in FIG. 13), at least partially overcoming the downward biasing force exerted by the spring 312. It should be understood that softer terrain, such as soft snow, will exert less upward force than harder terrain such as packed snow or dirt. Thus, if the rider anticipates using the snowmobile 100 in the reverse direction on soft snow, he can rotate the adjustment cam 314 so that the spring 312 will exert a comparatively weak biasing force that can be at least partially overcome by the comparatively weak upward force exerted on the track 128 by the soft snow. If the rider anticipates using the snowmobile 100 in the reverse direction on harder terrain, or primarily for towing in the forward direction, he can rotate the adjustment cam 314 so that the spring 312 will exert a comparatively strong biasing force, thereby urging the track 128 against the ground with a greater force to provide improved traction.

The operation of one blocker cam 318 will be described in detail below, and it should be understood that the other blocker cam 318 operates in substantially the same manner It is also contemplated that only a single blocker cam 318 or more than two blocker cams 318 could be provided. The lower stopper 320 and the upper stopper 322 are provided in general alignment with the blocker cam 318. The blocker cam 318 can be rotated about the axis 326 between a blocking position (not shown), and a non-blocking position, shown in FIGS. 9, 11 and 13. Although in the present embodiment the axes of rotation 326 of the adjustment cam 314 and the blocker cam 318 are coaxial, it should be understood that the two rotate independently, such that the adjustment cam 314 does not rotate when the blocker cam 318 is rotated and vice versa. The adjustment cam 314 and the blocker cam 318 may optionally be arranged such that they rotate about separate axes. Thus, the operation of the blocker cam 318 to prevent the extension arms 308 from pivoting to the raised position, which will be described in further detail below, is independent of the magnitude of the biasing force of the spring 312.

In FIGS. 9 to 12, the extension arms 308 are shown in the lowered position. In this position, the blocker cam 318 abuts against the lower stopper 320 to prevent the extension arms 308 from pivoting further downward to a position lower than the slide rails 302, regardless of the position of the blocker cam 318.

When the extension arms 308 are in the lowered position, the blocker cam 318 can be used to prevent the extension arms 308 from pivoting to the upper position. The blocker cam 318 can be turned to be placed in the blocking position. In this position, the blocker cam 318 abuts against the upper stopper 322 when the extension arms 308 are in the lowered position, or a position close to it, to limit upward movement of the extension arms 308 and prevent the extension arms 308 from pivoting to the raised position shown in FIG. 13 even when an upward force is exerted on the extension arms 308 by the terrain. This provides increased traction when desired by the rider.

Referring to FIGS. 9, 11 and 13, when the blocker cam 318 is in the non-blocking position, the blocker cam 318 is spaced away from the upper stopper 322 when the extension arms 308 are in the lowered position. In this configuration, extension arms 308 are able to pivot to the raised position shown in FIG. 13 when an upward force on the extension arms 308 is strong enough to overcome the downward biasing force of the spring 312. In the raised position, the blocker cam 318 abuts against the upper stopper 322 to limit further upward movement of the extension arms 308. When the extension arms 308 are in the upward position, the angle of the track 128 provides a ramp such that the track 128 will maintain or pull the snowmobile 100 on top of snow and other obstacles, and prevent the snowmobile 100 from becoming stuck.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
    a chassis including a tunnel, the tunnel having a longitudinal direction;
    an engine connected to the chassis;
    at least one ski connected to the chassis by a front suspension;
    an endless drive track disposed below the tunnel and operatively connected to the engine for propulsion of the snowmobile; and
    a rear suspension assembly supporting and tensioning the endless drive track,
    the chassis being pivotally connected to the endless drive track via the rear suspension assembly, the chassis being pivotable about a longitudinally extending axis relative to at least a portion of the endless drive track,
    the rear suspension assembly including:
        a first suspension arm having an upper end and a lower end, the upper end of the first suspension arm being pivotally connected to the tunnel;
        a second suspension arm having an upper end and a lower end, the upper end of the second suspension arm being pivotally connected to the tunnel;
        a pair of slide rails pivotally connected to the lower end of the first suspension arm and to the lower end of the second suspension arm;
        at least one shock absorber connected between the tunnel and the pair of slide rails, the at least one shock absorber biasing the pair of slide rails away from the tunnel;
        a pair of extension arms pivotally connected to a rear portion of the pair of slide rails about a lateral axis, the pair of extension arms being pivotable between a raised position and a lowered position with respect to the pair of slide rails about the lateral axis, the lateral axis being disposed above a point on the longitudinally extending axis that is longitudinally aligned with the lateral axis;
        a pair of rear idler wheels rotationally connected to a rear portion of the pair of extension arms for guiding the endless drive track, the pair of rear idler wheels being disposed laterally between the pair of extension arms; and
        at least one spring biasing the pair of extension arms toward the lowered position by exerting thereon a biasing force.

2. The snowmobile of claim 1, wherein the lateral axis is disposed above a line passing through a center of the pair of rear idler wheels and bisecting an angle between top and bottom track portions of the drive track extending forward from the pair of rear idler wheels when the pair of extension arms is in the lowered position.

3. The snowmobile of claim 1, wherein the rear suspension assembly further includes a movable member movable between a first position and a second position to adjust a magnitude of the biasing force.

4. The snowmobile of claim 1, wherein the rear suspension assembly further includes:
    at least one blocking cam mounted to one of the pair of slide rails and the pair of extension arms, the at least one blocking cam being movable between a first position and a second position to selectively prevent the pair of extension arms from pivoting from the lowered position to the raised position; and
    at least one stopper mounted to the other of the pair of slide rails and the pair of extension arms;
    wherein when the pair of extension arms is in the lowered position, the at least one blocking cam is movable between:
        the first position, where the at least one blocking cam prevents the pair of extension arms from pivoting to the raised position; and
        the second position, where the at least one blocking cam permits the pair of extension arms to pivot to the raised position;
    wherein when the at least one blocking cam is in the second position and the pair of extension arms is in the raised position, the at least one blocking cam abuts against the at least one stopper.

5. The snowmobile of claim 1, wherein the rear suspension assembly further includes a ball joint pivotally connecting the lower end of the second suspension arm to the pair of slide rails about the longitudinally extending axis.

6. The snowmobile of claim 5, wherein the lateral axis is a first lateral axis;
    wherein the rear suspension assembly further includes a rocker arm having an upper end and a lower end, the upper end of the rocker arm being pivotally connected to the lower end of the second suspension arm about a second lateral axis, the lower end of the rocker arm being pivotally connected to the pair of slide rails about a third lateral axis; and
    wherein the first lateral axis is vertically higher than the second lateral axis.

7. The snowmobile of claim 5, wherein the lateral axis is a first lateral axis;

wherein the rear suspension assembly further includes a rocker arm having an upper end and a lower end, the upper end of the rocker arm being pivotally connected to the lower end of the second suspension arm about a second lateral axis, the lower end of the rocker arm being pivotally connected to the pair of slide rails about a third lateral axis;

wherein the upper end of the first suspension arm is pivotally connected to the tunnel about a fourth lateral axis;

wherein the pair of rear idler wheels is rotationally connected to the rear portion of the pair of extension arms about a wheel axis;

wherein when the pair of extension arms is in the lowered position, the wheel axis is disposed below the longitudinally extending axis and above a longitudinally extending line passing through the second and fourth lateral axes; and wherein when the pair of extension arms is in the raised position, the wheel axis is disposed above the longitudinally extending axis and the longitudinally extending line.

8. A rear suspension assembly for a snowmobile, the snowmobile having a tunnel, the rear suspension assembly comprising:
a first suspension arm having an upper end and a lower end, the upper end of the first suspension arm being adapted to be pivotally connected to the tunnel;
a second suspension arm having an upper end and a lower end, the upper end of the second suspension arm being adapted to be pivotally connected to the tunnel;
a pair of slide rails pivotally connected to the lower end of the first suspension arm and to the lower end of the second suspension arm;
a ball joint pivotally connecting the lower end of the second suspension arm to the pair of slide rails about the longitudinally extending axis;
at least one shock absorber adapted to be connected to the tunnel and connected to the pair of slide rails, the at least one shock absorber being adapted for biasing the pair of slide rails away from the tunnel;
a pair of extension arms pivotally connected to a rear portion of the pair of slide rails about a first lateral axis, the pair of extension arms being pivotable between a raised position and a lowered position with respect to the pair of slide rails about the first lateral axis;
a rocker arm having an upper end and a lower end, the upper end of the rocker arm being pivotally connected to the lower end of the second suspension arm about a second lateral axis, the lower end of the rocker arm being pivotally connected to the pair of slide rails about a third lateral axis, the first lateral axis being vertically higher than the second lateral axis;
a pair of rear idler wheels rotationally connected to a rear portion of the pair of extension arms, the pair of rear idler wheels being disposed laterally between the pair of extension arms; and
at least one spring biasing the pair of extension arms toward the lowered position by exerting thereon a biasing force,
at least a portion of at least one of the first and second suspension arms being pivotable about a longitudinally extending axis relative to the pair of slide rails.

9. The rear suspension assembly of claim 8, wherein the lateral axis is disposed above a point on the longitudinally extending axis that is longitudinally aligned with the lateral axis.

10. The rear suspension assembly of claim 8, further comprising a pair of track tensioners operatively connecting the pair of rear idler wheels to the pair of extension arms, the pair of track tensioners being disposed laterally between the pair of extension arms.

11. The rear suspension assembly of claim 8, further comprising a movable member movable between a first position and a second position to adjust a magnitude of the biasing force.

12. The rear suspension assembly of claim 8, further comprising:
at least one blocking cam mounted to one of the pair of slide rails and the pair of extension arms, the at least one blocking cam being movable between a first position and a second position to selectively prevent the pair of extension arms from pivoting from the lowered position to the raised position; and
at least one stopper mounted to the other of the pair of slide rails and the pair of extension arms;
wherein when the pair of extension arms is in the lowered position, the at least one blocking cam is movable between:
the first position, where the at least one blocking cam prevents the pair of extension arms from pivoting to the raised position; and
the second position, where the at least one blocking cam permits the pair of extension arms to pivot to the raised position;
wherein when the at least one blocking cam is in the second position and the pair of extension arms is in the raised position, the at least one blocking cam abuts against the at least one stopper.

13. The rear suspension assembly of claim 8,
wherein the upper end of the first suspension arm is adapted to be pivotally connected to the tunnel about a fourth lateral axis;
wherein the pair of rear idler wheels is rotationally connected to the rear portion of the pair of extension arms about a wheel axis;
wherein when the pair of extension arms is in the lowered position, the wheel axis is disposed below the longitudinally extending axis and above a longitudinally extending line passing through the second and fourth lateral axes; and
wherein when the pair of extension arms is in the raised position, the wheel axis is disposed above the longitudinally extending axis and the longitudinally extending line.

14. The rear suspension assembly of claim 8, further comprising at least one pair of caps connected to at least one of a front end and a rear end of the pair of slide rails.

15. A slide rails replacement kit for replacing a pair of slide rails of a rear suspension assembly of a snowmobile, the snowmobile having:
a chassis including a tunnel, the tunnel having a longitudinal direction;
an engine connected to the chassis;
at least one ski connected to the chassis by a front suspension; and
an endless drive track disposed below the tunnel and operatively connected to the engine for propulsion of the snowmobile;
the rear suspension assembly supporting and tensioning the endless drive track,
the chassis being pivotally connected to the endless drive track via the rear suspension assembly, the chassis being pivotable about a longitudinally extending axis relative to at least a portion of the endless drive track, the rear suspension assembly including:
- a first suspension arm having an upper end and a lower end, the upper end of the first suspension arm being pivotally connected to the tunnel and the lower end of the first suspension arm being connected to the pair of slide rails;
- a second suspension arm having an upper end and a lower end, the upper end of the second suspension arm being pivotally connected to the tunnel and the lower end of the second suspension arm being connected to the pair of slide rails;
- at least one shock absorber connected between the tunnel and the pair of slide rails, the at least one shock absorber biasing the pair of slide rails away from the tunnel; and
- a pair of rear idler wheels rotationally connected to a rear portion of the pair of slide rails for guiding the endless drive track, the pair of rear idler wheels rotating about a first wheel axis disposed at a first distance from a front of the pair of slide rails, the first wheel axis being disposed forward of a rear end of the pair of slide rails, the pair of slide rails being a first pair of slide rails, the first pair of slide rails having a first length;

the kit comprising:
- a second pair of slide rails adapted to be pivotally connected to the lower end of the first suspension arm and to the lower end of the second suspension arm, and to be connected to the at least one shock absorber, the second pair of slide rails being intended for replacing the first pair of slide rails of the snowmobile;
- a pair of extension arms adapted to be pivotally connected to a rear portion of the second pair of slide rails about a lateral axis, the pair of extension arms, once connected to the pair of slide rails, being pivotable between a raised position and a lowered position with respect to the second pair of slide rails about the lateral axis,
- a rear portion of the extension arms being adapted to rotationally connect the pair of rear idler wheels about a second wheel axis,
- once the pair of extension arms is connected to the pair of slide rails, the second wheel axis being disposed at a second distance from a front of the second pair of slide rails when the pair of extension arms is in the lowered position, the second wheel axis being disposed between forward and rearward ends of the pair of extension arms; and
- at least one spring adapted to be operatively connected to the pair of extension arms for biasing the pair of extension arms toward the lowered position by exerting thereon a biasing force once the pair of extension arms is connected to the pair of slide rails, the second pair of slide rails having a second length, the second length being less than the first length, the second distance being equal to the first distance.

16. The kit of claim 15, wherein the pair of slide rails and the pair of extension arms are adapted to locate the lateral axis above the longitudinally extending axis once the kit is installed on the snowmobile.

17. The kit of claim 15, wherein the pair of extension arms is adapted to rotationally connect the pair of rear idler wheels laterally between the pair of extension arms.

* * * * *